US011667474B1

(12) United States Patent
Ferdosali et al.

(10) Patent No.: US 11,667,474 B1
(45) Date of Patent: Jun. 6, 2023

(54) INCREASING SCAN RATE OF PARCELS WITHIN MATERIAL HANDLING FACILITY

(71) Applicant: Amazon Technologies, Inc., Seattle, WA (US)

(72) Inventors: Payman Ferdosali, Pasadena, CA (US); Mohammad Taghizadeh, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/459,593

(22) Filed: Aug. 27, 2021

(51) Int. Cl.
| | |
|---|---|
| B65G 43/10 | (2006.01) |
| G06K 7/10 | (2006.01) |
| G06K 7/14 | (2006.01) |
| G06Q 30/018 | (2023.01) |
| G06Q 50/28 | (2012.01) |
| G05B 19/418 | (2006.01) |
| B23Q 5/22 | (2006.01) |
| G06V 10/24 | (2022.01) |
| G06V 30/14 | (2022.01) |
| B07C 3/14 | (2006.01) |

(52) U.S. Cl.
CPC ............... B65G 43/10 (2013.01); B23Q 5/22 (2013.01); G05B 19/4189 (2013.01); G06K 7/10435 (2013.01); G06K 7/10861 (2013.01); G06K 7/1447 (2013.01); G06K 7/1465 (2013.01); G06Q 30/0185 (2013.01); G06Q 50/28 (2013.01); G06V 10/245 (2022.01); G06V 30/1431 (2022.01); *B07C 3/14* (2013.01); *G05B 2219/45054* (2013.01); *G06K 7/1413* (2013.01)

(58) Field of Classification Search
CPC ................. G06V 10/14; G06V 10/245; G06K 7/10435; G06K 7/10861; G06K 17/00; G06Q 50/28; B65G 47/48; B65G 43/08
See application file for complete search history.

(56) References Cited

U.S. PATENT DOCUMENTS

| 5,331,118 | A | * | 7/1994 | Jensen | G01B 11/00 |
| | | | | | 702/170 |
| 5,818,019 | A | * | 10/1998 | Irwin, Jr. | G06K 19/067 |
| | | | | | 235/440 |
| 6,064,629 | A | * | 5/2000 | Stringer | G01B 11/00 |
| | | | | | 367/128 |
| 7,161,688 | B1 | * | 1/2007 | Bonner | B07C 3/00 |
| | | | | | 356/627 |

(Continued)

*Primary Examiner* — Daniel I Walsh
(74) *Attorney, Agent, or Firm* — Lee & Hayes, P.C.

(57) ABSTRACT

Systems and methods disclosed herein increase a scan rates of parcels within a material handling facility. In some instances, the systems and methods described herein focus an imaging device on a label attached to a parcel to capture image data of the label that is in focus. This permits the image data to be analyzed for discerning shipping identifiers that are used for sortation and/or processing the parcels. For example, a height of the parcel may be determined and a field of view (FOV) associated with capturing the image data may be correspondingly adjusted. Furthermore, other setting(s) associated with imaging the parcels may be adjusted. For example, lighting conditions may be adjusted to reduce glare, contrast, and/or brightness captured within the image(s), and/or other setting(s) of the imaging device may be updated, such as gain and exposure.

20 Claims, 5 Drawing Sheets

(56) References Cited

U.S. PATENT DOCUMENTS

| | | | | |
|---|---|---|---|---|
| 8,639,384 | B2* | 1/2014 | Young | G06Q 10/08 |
| | | | | 700/226 |
| 9,412,099 | B1* | 8/2016 | Tyree | A47F 9/04 |
| 9,451,674 | B1* | 9/2016 | Kong | H05B 47/155 |
| 9,612,583 | B1* | 4/2017 | Qaddoura | G05B 19/128 |
| 9,996,819 | B1* | 6/2018 | Modi | G10L 15/22 |
| 10,311,528 | B1* | 6/2019 | Vasquez, Jr. | G06Q 50/08 |
| 10,594,689 | B1* | 3/2020 | Weaver | H04L 9/3242 |
| 10,627,244 | B1* | 4/2020 | Lauka | G06Q 10/08355 |
| 11,074,541 | B2* | 7/2021 | Hanks | G06Q 30/04 |
| 11,208,270 | B1* | 12/2021 | Sewart | B65G 1/1371 |
| 2004/0225624 | A1* | 11/2004 | Reynolds | G06Q 20/204 |
| | | | | 705/401 |
| 2006/0007304 | A1* | 1/2006 | Anderson | G06K 17/0022 |
| | | | | 348/91 |
| 2006/0231209 | A1* | 10/2006 | Smith | B65C 9/46 |
| | | | | 156/379 |
| 2007/0237356 | A1* | 10/2007 | Dwinell | G06T 3/4038 |
| | | | | 382/101 |
| 2008/0225368 | A1* | 9/2008 | Ciabattoni | G02B 26/121 |
| | | | | 359/216.1 |
| 2008/0232659 | A1* | 9/2008 | Tajima | G06K 9/00 |
| | | | | 382/128 |
| 2008/0245873 | A1* | 10/2008 | Dwinell | G06T 7/60 |
| | | | | 235/462.41 |
| 2010/0116887 | A1* | 5/2010 | Barkan | G06K 17/00 |
| | | | | 235/440 |
| 2011/0280547 | A1* | 11/2011 | Fan | G08B 13/196 |
| | | | | 386/239 |
| 2014/0034456 | A1* | 2/2014 | Gehring | G06K 7/10861 |
| | | | | 198/810.01 |
| 2014/0319218 | A1* | 10/2014 | Harbison | G06K 7/0095 |
| | | | | 235/438 |
| 2014/0379613 | A1* | 12/2014 | Nishitani | G06Q 30/0283 |
| | | | | 702/155 |
| 2015/0352721 | A1* | 12/2015 | Wicks | B25J 9/1687 |
| | | | | 700/228 |
| 2016/0104022 | A1* | 4/2016 | Negro | G06K 7/1439 |
| | | | | 235/462.16 |
| 2016/0283602 | A1* | 9/2016 | Charpentier | G07G 1/0063 |
| 2016/0314272 | A1* | 10/2016 | Braunstein | G16H 40/67 |
| 2017/0161534 | A1* | 6/2017 | Gao | G06K 7/10861 |
| 2017/0351993 | A1* | 12/2017 | Vengalathur Srinath | |
| | | | | G09F 3/00 |
| 2017/0372157 | A1* | 12/2017 | Liu | G06V 10/147 |
| 2018/0068266 | A1* | 3/2018 | Kirmani | G06K 7/10861 |
| 2018/0144168 | A1* | 5/2018 | Schöpflin | G06K 7/1439 |
| 2019/0156316 | A1* | 5/2019 | Simske | G07G 1/0045 |
| 2019/0231105 | A1* | 8/2019 | Pointeau | G06Q 10/08 |
| 2019/0339693 | A1* | 11/2019 | Menon | B25J 9/1689 |
| 2020/0013011 | A1* | 1/2020 | Kashi | G06V 30/424 |
| 2020/0017317 | A1* | 1/2020 | Yap | B65G 1/1376 |
| 2020/0124631 | A1* | 4/2020 | Merlo | G06K 7/10722 |
| 2020/0193587 | A1* | 6/2020 | Mairhofer | G01N 21/4795 |
| 2020/0228733 | A1* | 7/2020 | Gao | G06K 7/10722 |
| 2020/0242392 | A1* | 7/2020 | Scott | G06V 10/25 |
| 2020/0410621 | A1* | 12/2020 | Wagner | G06K 7/10366 |
| 2021/0053216 | A1* | 2/2021 | Diankov | B25J 19/023 |
| 2021/0081702 | A1* | 3/2021 | Naito | G06F 1/3206 |
| 2021/0272309 | A1* | 9/2021 | Simpson | G06T 7/564 |
| 2022/0411201 | A1* | 12/2022 | Grupp | B65G 43/10 |
| 2023/0025837 | A1* | 1/2023 | Kim | G06K 7/1443 |

* cited by examiner

INCREASING SCAN RATE OF PARCELS WITHIN MATERIAL HANDLING FACILITY

BACKGROUND

Logistic centers or warehouses include sensor(s), such as scanners, that image packages for sortation, processing, and/or shipment. For example, the scanner(s) may scan barcodes, labels, or other identifier(s) on the package for routing the package to proper destinations. In some instances, however, the identifier(s) may be unreadable and/or the scanner(s) may include improper setting(s) for scanning the parcels. Here, additional time and resource(s) is spent sorting, reintroducing, and/or reprocessing these packages. Additionally, this causes packages to be delayed to consumers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The devices and systems depicted in the accompanying figures are not to scale and components within the figures may be depicted not to scale with each other.

DETAILED DESCRIPTION

Figure 1:
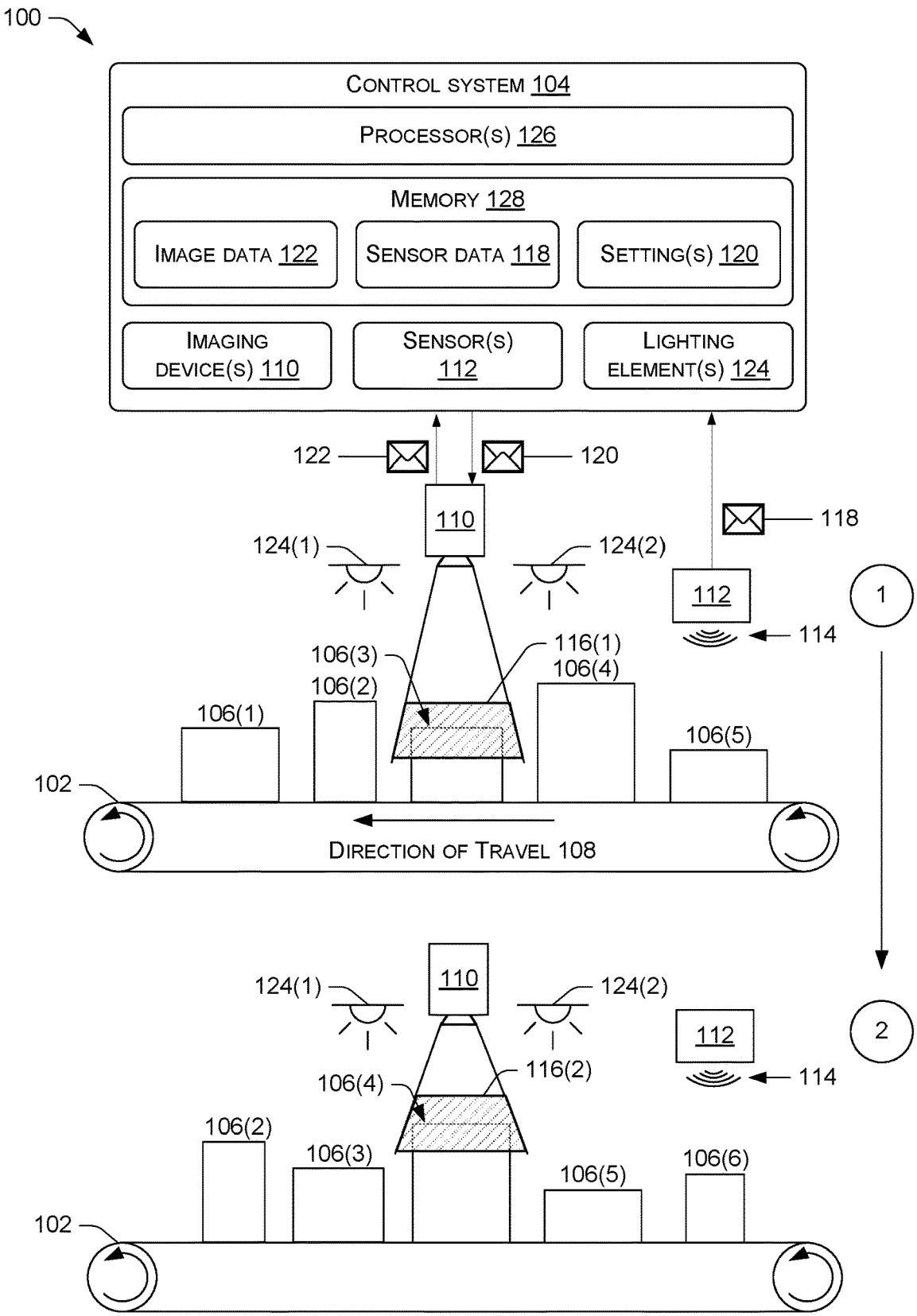
FIG. 1 illustrates an example environment that includes a conveyor system for transporting parcels within the environment, as well as a control system for determining setting(s) associated with imaging the parcels, according to an embodiment of the present disclosure.

This application describes, in part, systems and methods for increasing a successful scan rates of parcels within a material handling facility. In some instances, the systems and methods described herein may focus an imaging device (e.g., camera) on a label attached to a parcel. By focusing the imaging device in this manner, the imaging device may capture image data of the label that is in focus. Focusing the imaging device in this manner allows a field of view (FOV) of the imaging device to be dynamically adjusted to obtain image data of the label that is in focus. This permits the image data to be analyzed for discerning shipping identifiers (e.g., a barcode) that are used for sortation and/or processing the parcels. In some instances, the FOV may be based on a characteristic(s) of the parcels. For example, a height of the parcel may be determined and the FOV may be correspondingly adjusted such that a top of the parcel is within the FOV.

Here, it is envisioned that the label is located on the top of the parcel, and as such, images of the label may be in focus. Furthermore, other setting(s) associated with imaging the parcels may be adjusted. For example, lighting conditions may be adjusted to reduce glare, contrast, and/or brightness captured within the image(s), and/or other setting(s) of the imaging device may be adjusted (e.g., gain, exposure, brightness, contrast, etc.). Adjusting the FOV and/or setting(s) increases a success rate associated with scanning parcels. In turn, less time and/or resources may be spent sorting, reintroducing, and/or reprocessing unsuccessful scans. This may lead to increased throughput within the material handling facility and on-time deliveries of parcels to consumers.

In some instances, the material handling facility may represent a building, facility, center, or hub where item(s) are sorted, packaged, or inducted for shipment. Within the material handling facility, conveyor systems may transport the parcels (or items) between locations. For example, as item(s) are packaged for shipment, the parcels may travel along one or more conveyor systems for sortation to their final destination. As the parcels travel along the conveyor systems, the imaging device (e.g., scanner, reader, and so forth) images the parcels. In some instances, the imaging device is disposed overhead of the conveyor system and is oriented in a direction towards the conveyor system for imaging the parcels. In some instances, multiple imaging devices are disposed overhead and/or imaging devices may be disposed along the sides or the bottom of the conveyor system for imaging surfaces other than a top of the parcel.

Images generated by the imaging device are processed for determining barcodes, QR codes, and/or other identifier(s) located on the parcel. These identifier(s) are used to determine whether the parcel is identifiable (e.g., registered) and how to route the parcels for shipment within the material handling facility. Whether the parcel is identifiable may be based on the parcel being registered within a parcel database. For example, as item(s) are packaged for shipment, the parcels may be registered within the parcel database (e.g., associated with a destination). As the parcels travel throughout the material handling facility and are imaged (e.g., scanned) by the imaging device, the identifier(s) may be extracted and compared against the parcel database. Comparison to the parcel database indicates whether the identifier(s) is valid (e.g., registered). For example, as images of the parcels are analyzed and identifier(s) are extracted, the identifier(s) are compared against a registry of identifiers located with the parcel database. In instances where the identifier(s) are valid, so as to be contained within the parcel database, the destination of the parcel may be determined and the parcels may be sorted into bins, containers, gaylords, and the like for shipment. As an example, parcels that travel along the conveyor system and that are destined for Seattle, Wash. may be routed to one or more gaylords destined for shipment to Seattle, Wash.

Alternatively, if the identifier(s) of a parcel is unable to be extracted, the parcel may not be identifiable and as a result, the destination location may be unknown. For example, image(s) of the parcel may be blurry, out of focus, include a low resolution, and so forth. In such instances, the image(s) may be of insufficient quality to permit the identifier(s) to be extracted. These unsuccessful scans may be associated with settings of the imaging device(s) (e.g., contrast, exposure, gain, etc.) and/or lighting conditions within the material handling facility. In such instances, the parcel may be routed to a defect area within the material handing facility in which the parcels are manually tended to.

For example, new labels may be printed and adhered to the parcels for reintroduced and/or reprocessing. Other instances may also cause the identifier(s) to be unidentifiable. Labels may become damaged (e.g., scratched) the identifier may be unreadable (e.g., the identifier is unable to be extracted), parcels may be too large for processing, labels may be skewed on the parcels, the labels may be outside a region of interest (ROI) associated with the FOV, and so forth.

In an effort to capture images that are in focus, and therefore, capable of being analyzed to extract the identifier(s) of the parcels, lens(es) may adjust a FOV associated with the imaging device. The FOV includes a focal length, measured from the lens to a point within the material handling facility associated with imaging the parcels. Within the FOV, images are in focus and of sufficient resolution to permit the extraction of identifier(s). As the parcels may be associated with respective dimensions (e.g., height, width, depth), a distance interposed between the parcel and the imaging device varies. In such instances, without adjusting the FOV of the imaging device, images of the parcels (and therefore the labels) may be located outside of the FOV and as a result, out of focus, blurred, unreadable, and so forth. That is, although the imaging device may capture image(s) of the label, the image(s) may be blurred or have a low resolution such that the identifier(s) are unreadable. In such instances, a scan of the parcel is unsuccessful and a destination location associated with the parcel is unable to be determined. However, as disclosed herein, the FOV of the imaging device is adjustable for capturing images that are in focus. This leads to an increased success rate in extracting the identifier(s) of the parcels.

The FOV may be adjusted at least in part by sensor(s) arranged to capture information associated with the parcels. The sensor(s) may be disposed upstream of the imaging device(s) for determining dimensions of the parcels traveling in a direction towards the imaging device. Example sensor(s) include LIDAR, RADAR, infrared light sensor(s), proximity sensors, profilers, displacement sensors, and the like. The sensor(s) output signals (e.g., IR light, sound, etc.) in a direction towards the parcels that travel on the conveyor system. Reflected signals are received by the sensor(s) and the signals may be analyzed to determine a height of the parcel above a surface of the conveyor system. For example, sensor data is generated by the sensor(s) and the sensor data may be analyzed to determine dimensions of the parcels (e.g., triangulation, time of flight, etc.). In some instances, the dimensions of the parcel include a height of the parcel. Using this information, a distance between the imaging device and a top of the parcel may be determined.

The height of the parcel and/or the distance to the top of the parcel and the imaging device may be utilized for making adjustment(s) to the FOV. In some instances, adjusting the FOV may include widening the FOV or narrowing the FOV. Here, adjusting the FOV may correspondingly adjust a focal length of the imaging device. For example, based on the height of the parcel, the FOV of may be adjusted such that the top of the parcel is within the FOV of the imaging device. In doing so, the top of the parcel may be in focus when image(s) of the parcel are captured. In turn, as the image(s) are analyzed the identifier(s) may be in focus and capable of being extracted for comparison to the parcel database. In this manner, the sensor(s) are used as a feed forward control to adjust the FOV of the imaging device such that when the parcel arrives at the imaging device, the imaging device has a FOV associated with capturing image(s) of the label on the parcel. In such instances, the sensor(s) are located upstream of the imaging device to permit the dimensions of the parcel to be determined, and then based on the dimensions, the FOV of the imaging device is adjusted.

Additionally, other setting(s) within the material handling facility may be adjusted based on the dimensions of the parcel. For example, for taller parcels where the top is located closer to the imaging device(s), lighting element(s) may output less light to avoid glare, increase contrast, and/or reduce brightness within the image(s) being captured. For smaller parcels where the top is located farther from the imaging device(s), the lighting element(s) may output more light to illuminate the parcel when imaged. As an example, if the distance between the imaging device and the top of the parcel is a first distance (e.g., 12 inches), a first intensity of light may be output, and if the distance between the imaging device and the top of the part is a second distance that is greater than the first distance (e.g., 24 inches), a second intensity of the light may be output. The second intensity of light may be greater than the first intensity of light. Modulating the amount (intensity) of light output may therefore affect glare, contrast, and/or brightness within the image(s), which may impact the ability to successfully extract identifier(s) on the parcels.

In some instances, based on the dimensions of the parcel, a ROI within the FOV may be captured. For example, as part of adjusting the FOV for the imaging device(s), the systems and methods herein may adjust the ROI within the FOV for capturing image data. The ROI may be determined based on the dimensions of the parcel, and/or via a historical database indicating a location of the labels adhered to the parcels. For example, the ROI may represent a 2×2 inch square within the FOV for which the imaging device(s) is to capture image data of the label. As such, the image data may not represent the entire FOV of the imaging device(s), but rather, in some instances, may represent the ROI. Here, the imaging device may be instructed as to the ROI based on the parcels being imaged and/or a historical database indicating the previous ROIs. In some instance, the ROI may be an entirety of the FOV, or may be a section (e.g., portion) of the FOV.

Other settings of the imaging device(s) and/or lighting element(s) may be adjusted. For example, imaging device setting(s), such as exposure, gain, brightness, contrast, focus, internal illumination, delay, light polarity, etc. may be adjusted.

Although the discussion herein relates to determining a height of the parcel and/or adjusting the FOV such that the top of the parcel is in focus, other embodiments are contemplated. That is, conventionally, labels are positioned upright on parcels, facing the imaging device disposed overhead on the conveyor system. However, in some instances, labels may be placed on sides of the parcels and/or the parcels may shift during transport along the conveyor system. Here, the labels may not be oriented towards or facing the imaging device. To account for such instances, one or more additional or alternative imaging device(s) may be arranged to image sides (or the bottom) of the parcels. That is, the imaging device(s) need not image a top of the parcels. The imaging device(s) may therefore be arranged overhead and/or along sides/bottom of the conveyor system for imaging the parcels. In such instances, the sensor(s) may measure a distance interposed between the imaging device(s), respectively, and the parcels. The FOV may therefore be determined such that at least a portion of the parcel is in focus within the FOV. Light setting(s) may additionally, or alternatively, be adjusted.

In some instances, despite adjusting the FOV, the identifier(s) on the parcels may be unreadable or otherwise unsuccessfully extracted. For example, the images may be distorted, the labels may be misplaced on the parcel, the parcels may be of sizes that are not readable by the imaging device, the labels may be damaged (e.g., scratched), the labels may be placed within shipping label sleeves, and so forth. Additionally, setting(s) of the imaging device(s) may be improper, such as exposure, gain, internal illumination, and so forth. In these, and other instances, the identifier(s) may be unable to be extracted. That is, although the FOV and/or other setting(s) were adjusted, the identifier(s) may be unidentifiable within the image(s). In some instances, the unidentifiable or unreadable parcels may be considered as defective, and in such instances, the image(s) may be further analyzed to determine one or more characteristic(s) of the label, the parcel, the image data, and/or the material handling facility that lead to the unsuccessful extraction of the identifier(s). Such analysis may determine a cause of unsuccessful scans and in turn, adjustments may be made to the imaging device, the lighting element(s), and/or other setting(s) within the material handling facility. In some instances, if the identifier(s) is/are unreadable, regardless of adjustments to the FOV and/or the light condition(s), the parcel(s) may be identified through other mechanisms (e.g., weight, size, shape, etc.). In some instances, if a first identifier is unreadable (e.g., a first label atop the parcel), the parcel may be identified via a second identifier (e.g., a second label atop the parcel).

As an example, ambient lighting conditions within the material handling facility may change (e.g., between nighttime and daytime). The ambient lighting conditions may affect the ability to obtain image data (e.g., sufficient brightness, sufficient contrast, etc.) in which the identifier(s) are extractable. In the nighttime, for example, where less ambient light is available, the lighting element(s) may illuminate the parcels. However, during the daytime with increased ambient lighting, the lighting element(s) may be dimmed to output less light. To determine the effect of lighting and reading the parcels, in this example, a contrast and/or brightness of the image(s) may be determined. For example, the image(s) may be analyzed to determine whether the image(s) are grayed out and dark. In instances where the image(s) are grayed out and dark, labels within the image(s) may be unreadable. This may be caused in instances where the lighting element(s) output an insufficient amount of light and/or internal lighting setting(s) of the imaging device(s). Comparatively, if the image(s) are too bright, the image(s) may not contain sufficient contrast to identify and extract the identifier(s). In some instances, the image(s) are analyzed to determine brightness and contrast values within the image. If these values exceed a threshold, or are outside an acceptable range, then the image(s) may be determined to be too bright, too dull, have too low of a contrast, have too high of a contrast, and so forth. As such, a cause of the unsuccessful extraction may be determined. Using this example, the lighting element(s) may be adjusted to output less light or more light and/or an internal illumination intensity of the imaging device(s) may be adjusted. Adjusting the luminosity of the lighting element(s) and/or an internal illumination of the imaging device(s) may increase the quality of image(s) captured, and therefore, lead to an increase in successfully extracting the identifier(s).

The lighting element(s) may be adjusted for future parcels being imaged by the imaging device based on the feedback received from previous unsuccessful extractions. In some instances, whether the lighting element(s) are adjusted may be based on a threshold number of image(s) or parcels having a similar defect. For example, if threshold number of parcels are unreadable because the image(s) are too bright, the lighting element(s) and/or the imaging device may be dimmed (or output less luminous light) to account for conditions within the material handling facility. In this manner, defects (or reasons) of previous unsuccessful extractions may be determined for use in identifying causes of the unsuccessful extractions and as such, adjustment(s) may be made.

Lighting conditions are just one factor that may affect successfully extracting the identifier(s) on the parcel. For example, the conveyor system may be travelling too fast for imaging by the imaging device, resulting in blurred images, the imaging device may be misaligned relative to the conveyor systems (e.g., shifted), the labels may be skewed on the parcels, the imaging device(s) may have incorrect exposure, contrast, brightness, focus, and/or gain setting(s), and so forth. Additionally, the imaging device(s) may not be imaging a proper ROI within the FOV. These, and other instances, may lead to an unsuccessful extraction of the identifier(s). In instances where the identifier(s) are unsuccessfully extracted, as noted above, images associated with the unsuccessful scans be analyzed to determine causes associated therewith. For example, setting(s) of the imaging device(s) and/or lighting element(s) may be correlated with unsuccessful scans. Such correlations may be drawn between gain, exposure, and contrast, for example, with the inability to successfully extract the identifier(s). Alternatively, correlations may be drawn between gain, exposure, and contrast, for example, with the ability to successfully extract the identifier(s). More generally, settings associated with the imaging device(s) and/or the lighting element(s) are associated with unsuccessful scans of the parcels. The correlations between unsuccessful scans may be determined for making adjustments in an effort to increase a successful extraction of identifier(s) in future instances. For example, adjustment(s) may be made in the positioning of the imaging device(s) within the material handing facility, a processing of the image(s) (e.g., preprocessing the images to straighten/unskew the image(s)), a speed of the conveyor system, a gain of the imaging device(s), a contrast of the imaging device(s), and so forth. By applying these adjustments, subsequent images that are captured may be have an increased success of extracting the identifier(s).

In some instances, machine-learned model(s) may be utilized for use in identifying the defect(s) within the image(s) and/or otherwise a cause of unsuccessful extractions. The machine-learned model(s) may be trained to draw correlations between lighting conditions, skewed images, conveyor system speeds, exposure, gain, parcel size, internal luminosity of the imaging device(s), brightness, and so forth between unsuccessful extractions, as well as successful extractions. Artificial intelligence may also identify the ROI in which the imaging device(s) is to capture image data of the parcels. For example, if only a portion of the labels are presented within the image data, Artificial intelligence may determine to adjust the ROI (e.g., shift in one or more directions, enlarge, etc.). The correlations extracted or otherwise determined by the machine-learned models may be utilized when making adjustments, or determining settings of the imaging device(s) and/or lighting element(s), associated with processing the parcels within the material handling facility. As an example, the machine-learned model(s) may determine that a threshold number of scans are unsuccessful because the image(s) are too bright. In such instances, the lighting element(s) may be turned off and/or dimmed, an exposure of the imaging device(s) may be reduced, an internal illumination of the imaging device(s) may be reduced, a gain of the imaging device(s) may be reduced, and so forth. If the number of defect(s) does not subside, the machine-learning model(s) may determine other causes. As a result, the machine-learned model(s) may correlate unsuccessful extractions with whether the image(s) are distorted, label(s) are diagonal on the parcels, parcels are of non-conventional sizes, label(s) are non-conventional, image(s) include insufficient light, contrast, imaging device setting(s) are improper, and so forth. In some instances, the machine-learned model(s) may employ artificial intelligence (AI) techniques to draw correlations between unsuccessful (and/or successful) scans with setting(s) of the imaging device(s) and/or the lighting element(s). The machine-learned model(s) may therefore determine which combination of imaging device(s) setting(s) and setting(s) associated with the lighting element(s) lead to a successful extraction of identifier(s). Such setting(s) are dynamically determined, based on conditions within the material handling facility (e.g., ambient lighting) and/or characteristic(s) of the parcels. Additionally, in some instances, AI (such as image processing) may be used to extract features from the image data, determine the imaging device(s) setting(s) (e.g., Fuzzy Logic). In some instances, machine learning may be used to classify defects or identify patterns in the defects.

The system and methods disclosed herein therefore provide techniques for increasing a successful scan rate of parcels. The sensor(s) are arranged to monitor parcels being imaged by imaging device(s) for use in adjusting a FOV of the imaging device and/or other setting(s) within the material handling facility. Setting(s) are optimized for increasing a successful scan rate of the parcels, such as brightness, contrast, intensity, resolution, gain, and so forth. For example, labels of the parcels may be in focus for extracting identifier(s) and processing the parcels within the material handling facility. Additionally, in instances where the identifier(s) are unable to be extracted, the systems and methods may determine causes of such. For example, the systems and methods may determine lighting conditions in the material handling facility, and whether the image(s) captured by the imaging device(s) were too bright or too dull, whether the image(s) do not contain sufficient contrast for processing the parcels, and so forth. As a result, adjustment(s) may be implemented when processing the image(s), setting(s) of the imaging device(s) may be adjusted, setting(s) of the lighting element(s) may be adjusted, and/or other setting(s) within the material handling facility may be implemented, such as a speed of the conveyor system.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment 100 including a conveyor system 102 and a control system 104. In some instances, the environment 100 may represent an order fulfillment center or facility in which orders are sorted or otherwise fulfilled, processed, and/or categorized for shipment. Although not shown, the environment 100 may include inventory for shipment. Generally, the inventory stores an inventory of items (e.g., clothing, electronics, toys, household goods, etc.) that are packaged and labeled for shipment. In some instances, the items may be stored in bins, slots, shelves, containers, crates, stalls, racks, etc. The inventory may be dispersed about the environment 100 and/or may be located in dedicated areas of the environment 100 (e.g., perimeter). Additionally, or alternatively, in some instances, the inventory may be located separate from the environment 100. Furthermore, in some instances, the environment 100 may not include the inventory, such as in a sortation center or cross-docking station. Here, the environment 100 may receive previously packaged items for further sortation and/or delivery to a variety of destinations.

As orders are processed for shipment, the orders (e.g., packages, parcels, etc.) may be conveyed or otherwise transported within the environment 100 via the conveyor system 102. Although the discussion herein relates to a single conveyor system, it is to be understood that the environment 100 (or other environments) may include any number of conveyor systems (e.g., placed in series, parallel, etc.). Generally, the conveyor system 102 assists in transporting orders, goods, parcels, etc. from one location to another within the environment 100. For example, after orders are packaged or otherwise arrive within/at the environment 100, such as in the case of a cross-docking station, parcels 106 (e.g., boxes, envelopes, etc.) may be routed by the conveyor system 102 for shipment, processing, and/or sortation. In some instances, the parcels 106 may be placed directly onto the conveyor system 102, atop rollers, belts, wheels, etc. and the like that rotate or otherwise translate for conveying the parcels 106. As shown, the conveyor system 102 may translate the parcels 106 in a direction of travel 108. One or more electric motors (e.g., DC motor(s)) may power the conveyor system 102 in the direction of travel 108.

The parcels 106 are shown including a plurality of parcels located on the conveyor system 102. For example, at "1" in FIG. 1, a first parcel 106(1), a second parcel 106(2), a third parcel 106(3), a fourth parcel 106(4), and a fifth parcel 106(5) are shown located on the conveyor system 102. As the conveyor system 102 translates in the direction of travel 108, parcels are removed while additional parcels are added to (or arrive at) the conveyor system 102, manually and/or via an automated or partially automated process (e.g., a robotic arm, etc.). For example, at "2" in FIG. 1, the second parcel 106(2), the third parcel 106(3), the fourth parcel 106(4), the fifth parcel 106(5), as well as a sixth parcel 106(6), are shown located on the conveyor system 102. As such, as the first parcel 106(1) leaves the conveyor system 102 (e.g., transferred to another conveyor system, transferred to sorting bin, etc.), the sixth parcel 106(6) may be placed onto the conveyor system 102. However, the conveyor system 102 may be configured to translate more than or less than five parcels at any given time.

The portion of the conveyor system 102 shown in FIG. 1 may represent an area in which the parcels 106 are scanned for processing. For example, as the parcels 106 travel along the conveyor system 102, the parcels 106 may be imaged (e.g., scanned, read, identified, etc.) for routing the parcels 106 to their respective destinations. For example, based on their intended destination, the parcels 106 may be sorted into containers readied for shipment. Like parcels that are destined for the same location (or area) may be sorted into common containers. Such sortation may be accomplished by routing the parcels 106 along a length of the conveyor system 102 (or additional conveyor system). For example, the parcels 106 may be sorted from the conveyor system 102 to one or more additional conveyor systems via actuating arm(s), levers, and so forth that redirect (e.g., route) the parcels 106.

As part of this process, and to determine how to route the parcels 106, the environment 100 is shown including imaging device(s) 110. The imaging device(s) 110 may represent a camera, a reader, a scanner, or other imager that scans or otherwise reads labels located on the parcels 106. The images captured by the imaging device(s) 110 may therefore represent labels or other identifier(s) placed on the parcels 106 and the image(s) may be processed for determining the destination locations of the parcels 106, respectively. As an example, the identifier(s) may represent barcodes, QR codes, and the like for determining the addresses, recipients, senders, and so forth. The imaging device(s) 110 may be configured to identify a particular identifier (e.g., barcode) and/or the imaging device(s) 110 may image more than one identifier for identifying the parcel 106. Additionally, text, numbers, characters, and so forth may be identified and/or analyzed to determine how to route and/or otherwise process the parcels.

The imaging device(s) 110 is shown residing vertically above (e.g., overhead) of the conveyor system 102 and the parcels 106. The imaging device(s) 110 is oriented towards the conveyor system 102 so as to image the parcels 106 as the parcels 106 pass beneath the imaging device(s) 110. In other words, as the conveyor system 102 translates the parcels 106, and the parcels 106 pass beneath the imaging device(s) 110, respectively, the imaging device(s) 110 captures image(s) of the parcels 106.

As shown, the parcels 106 may be of varying sizes, dimensions, shapes, and so forth. To capture image(s) of the labels across the various sized parcels 106, the imaging device(s) 110 may have a variable field of view (FOV). As the conveyor system 102 may receive the parcels 106 of varying dimension(s), the FOV of the imaging device(s) 110 may be adjusted such that image(s) obtained from the imaging device(s) 110 are in focus and capable of being read (e.g., processed) for extracting the identifier(s) from the labels. That is, to increase a success rate in reading the parcels 106, the labels may be in focus such that the identifier(s) are capable of being extracted, or likelihood of the identifier(s) being extracted may increase. In some instances, and as discussed herein, a region of interest (ROI) associated with, or within the FOV, may be determined for extracting the identifier(s).

Determining the dimension(s) of the parcels 106 may come by way of sensor(s) 112 that are located upstream of the imaging device(s) 110. The sensor(s) 112 output signal(s) 114 (e.g., sound, light, IR, etc.) in a direction towards the parcels 106. The sensor(s) 112 then receive reflected signal(s) that are analyzed to determine dimension(s) of the parcels 106. Based on the dimensions of the parcels 106, the FOV of the imaging device(s) 110 may be adjusted. Other setting(s) of the imaging device(s) 110, as discussed herein, may be adjusted based on the dimension of the parcels 106 (e.g., ROI, gain, exposure, etc.). Example sensor(s) 112 include laser displacement sensors, CMOS sensors, range sensors, and so forth.

For example, at "1", the imaging device(s) 110 may have a first FOV 116(1) associated with capturing image(s) of the third parcel 106(3). The first FOV 116(1) is determined based at least in part on sensor data 118 captured by the sensor(s) 112. That is, at a previous instance in time when the third parcel 106(3) passed beneath the sensor(s) 112, the signal(s) 114 were output in a direction towards the third parcel 106(3) and the sensor(s) 112 received reflected signals. These signals are associated with the sensor data 118 that is transmitted to the control system 104, which in turn, may determine dimension(s) of the third parcel 106(3). Based on these dimension(s), the control system 104 may determine the first FOV 116(1) such that when the third parcel 106(3) passes the imaging device(s) 110, the imaging device(s) 110 has the first FOV 116(1) for imaging the third parcel 106(3).

The sensor(s) 112 therefore transmits the sensor data 118 to the control system 104 as part of a feed forward control such that when the third parcel 106(3) arrives at the imaging device(s) 110, the imaging device(s) 110 has an appropriate FOV for imaging the third parcel 106(3). Within the FOV, image(s) are in focus and of sufficient resolution to permit identifier(s) on the label(s) to be extracted. The control system 104 provides setting(s) 120 to the imaging device(s) 110 corresponding to the FOV. For example, before the third parcel 106(3) arrives at the imaging device(s) 110, the control system 104 transmits the setting(s) 120 to the imaging device(s) 110. In response, the imaging device(s) 110 may adjust to the first FOV 116(1). This may come by way of motor(s) that actuate lens(es) of the imaging device(s) 110 to correspondingly change the focal length of the imaging device(s) 110, and therefore the FOV.

As shown at "1", a top of the third parcel 106(3) is within the first FOV 116(1). Here, the top of the third parcel 106(3) may be in focus. In other words, a label may be placed atop the third parcel 106(3), facing the imaging device(s) 110 and the top of the third parcel 106(3) is within the first FOV 116(1). Being as the top of the third parcel 106(3) is within the first FOV 116(1), image(s) captured of the label (located on top the third parcel 106(3)) may be in focus and processed to determine the identifier associated with the third parcel 106(3). In some instances, the first FOV 116(1) may be associated with a width, depth, and height. The height of the first FOV 116(1) may be vertically centered on the top of third parcel 106(3). The first FOV 116(1) may be different than shown in FIG. 1 (e.g., narrower, wider, etc.). In some instances, image(s) captured by the imaging device(s) 110 may represent an entirety of the first FOV 116(1) or a particular portion of the first FOV 116(1), such as a ROI within the first FOV 116(1) associated with imaging the parcels 106.

After capturing the image(s), the imaging device(s) 110 transmit image data 122 to the control system 104. The image data 122 is received and/or stored by the control system 104 for processing. For example, the control system 104 may receive the image data 122 and process the image data 122 to extract the identifier for use in determining the addresses, recipients, senders, and so forth associated with the third parcel 106(3). Using such information, the third parcel 106(3) is routed to a location within the environment 100 for shipment.

This process repeats for additional parcels 106 on the conveyor system 102. For example, at "2" the imaging device(s) 110 is shown having a second FOV 116(2) for imaging the fourth parcel 106(4). The second FOV 116(2) may be based at least in part on sensor data 118 corresponding to the fourth parcel 106(4), captured while the fourth parcel 106(4) passed the sensor(s) 112. The second FOV 116(2) is shown being different than the first FOV 116(1) such that a label located atop the fourth parcel 106(4) is in focus and identifier(s) of the label are in focus and of sufficient resolution. The height of the second FOV 116(2) may be vertically centered on the top of fourth parcel 106(4). The second FOV 116(2) may be different than shown in FIG. 1. As discussed herein, a speed of the conveyor system 102 may be used to determine when the parcels 106 will respectively arrive at the imaging device(s) 110. This allows the FOV 116 to be implemented for each of the parcels 106, respectively.

The environment 100 is further shown including lighting element(s) 124, such as first lighting element(s) 124(1) and second lighting element(s) 124(2), disposed adjacent to the imaging device(s) 110. The lighting element(s) 124 output light to illuminate the parcels 106 as the parcels 106 pass underneath the imaging device(s) 110. In some instances, the lighting element(s) 124 represent light emitting diodes (LEDS), organic light emitting diodes (OLEDS), Halogen lights, and so forth. Light output by the lighting element(s) illuminates the parcels 106 to increase image quality (e.g., contrast, brightness, and so forth). In turn, identifier(s) on the labels may be identifiable for processing the parcels 106. In some instances, the amount of illumination output by the lighting element(s) 124 may be variable and based on lighting condition(s) within the environment 100 and/or a size of the parcels 106. For example, for taller parcels that are disposed closer to the imaging device(s) 110, a less amount of lighting may be used to reduce glare, reduce brightness, or increase contrast perceived in the image(s).

Additionally, or alternatively, the imaging device(s) 110 may have their own internal illumination that is adjustable. Other setting(s) of the imaging device(s) 110, such as exposure, contrast, brightness, focus, delay, ROI and/or gain may be also be determined and adjusted based on the dimensions of the parcels 106. As also discussed herein, the setting(s) of the imaging device(s) 110 may be adjusted based on unsuccessful scans of the parcels 106. Still, other setting(s) of the imaging device(s) 110, such as polarity, delay, time of illumination, and so forth may be adjusted based on the parcels 106 being imaged.

The control system 104 is shown including processor(s) 126 and memory 128, where the processor(s) 126 may perform various functions and operations associated with processing the sensor data 118, determining the FOV, and processing the image data 122 to extract the identifier(s), and the memory 128 may store instructions executable by the processor(s) 126 to perform the operations described herein. As shown, the sensor data 118, the setting(s) 120, and the image data 122 may be stored within the memory 128 of the control system 104. Additionally, the imaging device(s) 110, the sensor(s) 112, and/or the lighting element(s) 124 may be components of the control system 104. However, in some instances, the imaging device(s) 110, the sensor(s) 112, and/or the lighting element(s) 124 may be separate components and not part of the control system 104. However, the control system 104 may communicatively couple to the imaging device(s) 110, the sensor(s) 112, and/or the lighting element(s) 124 for receiving the sensor data 118, transmitting the setting(s) 120, and receiving the image data 122, for example. Moreover, the environment 100 may include other computing device(s) to which the control system 104 and/or the imaging device(s) 110, the sensor(s) 112, and/or the lighting element(s) 124 communicatively couple. For example, one or more intermediary computing device(s) may cause the imaging device(s) 110 to adjust the FOV. The control system 104 may couple to the imaging device(s) 110, the sensor(s) 112, the lighting element(s) 124, and/or other computing device over any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, the control system 104 may be located within the environment 100 and/or remote from the environment 100. The control system 104 may further be implemented as one or more servers and may, in some instances, form a portion of a network-accessible computing platform implemented as a computing infrastructure of processors, storage, software, data access, etc. that is maintained and accessible via a network such as the Internet. Common expressions associated with the control system 104 include "on-demand computing", "software as a service (SaaS)", "platform computing", "network-accessible platform", "cloud services", "data centers", etc.

Although the above discussion relates to imaging a top of the parcels 106, other embodiments are envisioned. For example, the imaging device(s) 110 may additionally, or alternatively, be located along sides and/or bottom of the conveyor system 102 to image one or more sides and/or the bottom of the parcels 106. Such imaging may find use in instances where labels are not facing the imaging device(s) 110 as shown in FIG. 1. In such instances, the sensor(s) 112 may generally be used to determine a distance interposed between the parcels 106 and the sensor(s) 112. Such distance, whether between a top of the parcels 106 and the imaging device(s) 110, or between a side of the parcels 106 and the imaging device(s) 110, may be used to determine a respective FOV for capturing image(s) of the parcels 106. Moreover, the sensor(s) 112 need not be located overhead of the parcels 106, but may be located on sides of the conveyor system 102 for imaging sides of the parcels 106.

Still, it is to be understood that the FOV and/or other setting(s) of the imaging device(s) 110 and/or lighting element(s) 124 may be continuously and routinely adjusted as the parcels 106 traverse the conveyor system 102. In some instances, the imaging device(s) 110 may image two parcels simultaneously within the FOV (e.g., side by side on the conveyor system 102) and/or the conveyor system 102 may include multiple imaging device(s) 110 that respectively image the parcels 106.

Figure 2:
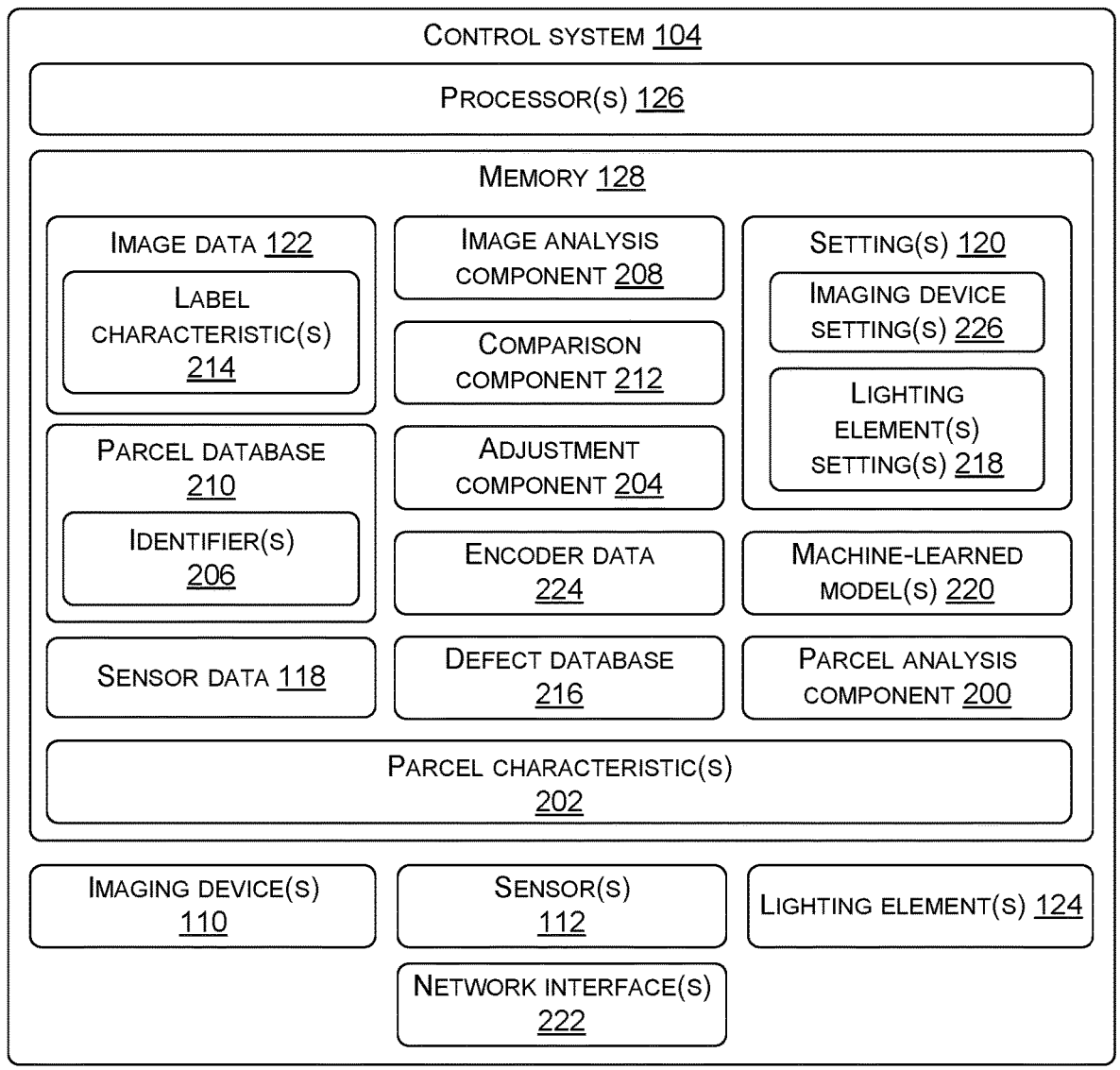
FIG. 2 illustrates example components of the control system of FIG. 1, according to an embodiment of the present disclosure.

FIG. 2 illustrates example components of the control system 104. As introduced above, the control system 104 includes the processor(s) 126 and the memory 128, which stores or otherwise has access to the sensor data 118, the setting(s) 120, and the image data 122.

The sensor data 118 represents data generated by the sensor(s) 112, which as noted above, are arranged to determine dimension(s) of the parcels 106. For example, as the sensor(s) 112 emit the signal(s) 114 towards the parcels 106 traveling on the conveyor system 102, reflected signals are received by the sensor(s) 112. Using the reflected signal(s), the sensor(s) 112 may generate the sensor data 118. Therein, the control system 104 receives the sensor data 118 for determining the dimension(s) of the parcel 106.

In some instances, the control system 104 includes a parcel analysis component 200 that receives the sensor data 118 and processes the sensor data 118 to determine the dimension(s) of the parcel 106. For example, the parcel analysis component 200 may determine an amount of time the signal(s) 114 took to arrive back at the sensor(s) 112 (e.g., time of flight (ToF) techniques). Here, the time may be associated with a size of the parcels 106, or a distance between the sensor(s) 112 and the parcels 106. The parcel analysis component 200 may also utilize a known distance between the sensor(s) 112 and the conveyor system 102 (e.g., belt) to determine the dimension(s) of the parcel 106. In some instances, the parcel analysis component 200 may also determine a distance interposed between the sensor(s) 112 and the parcels 106, or surfaces thereof. After the dimension(s) of the parcels 106 are determined, such information is stored as parcel characteristic(s) 202 within the memory 128. The parcel characteristic(s) 202 may also be associated with geometries, sizes, shapes, and so forth of the parcels 106.

In some instances, the control system 104 includes an adjustment component 204 that processes and analyzes the parcel characteristic(s) 202 for determining the setting(s) 120. The setting(s) 120 may include an associated FOV 116 for capturing image(s) of the parcels 106. The FOV 116 is representative of the first FOV 116(1) and the second FOV 116(2) as discussed and introduced above in FIG. 1. Using the parcel characteristic(s) 202, the adjustment component 204 may determine a respective FOV 116 for the imaging device(s) 110 such that the image data 122 captured by the imaging device(s) 110 is in focus. The FOV 116 may be associated with an area in which image(s) are captured by the imaging device(s) 110. In some instances, the area may include a height, width, and/or depth relative to the imaging device(s) 110. Such determination may also be made knowing a distance between the imaging device(s) 110 and the conveyor system 102. The adjustment component 204 determines how to adjust the focal length of the imaging device(s) 110 (e.g., lens(es)) such that the image data 122 is in focus. In some instances, this may include shortening the focal length for parcels 106 that are disposed closer to the conveyor system 102, as compared to lengthening the focal length for parcels 106 that are disposed farther away from the conveyor system 102. Noted above, having the image data 122 in focus is accomplished in instances where a surface of the parcels 106 facing the imaging device(s) 110 are within the FOV 116. For example, if a top of the parcel 106 faces the imaging device(s) 110, the FOV 116 may be adjusted such that the top of the parcel is within the FOV 116.

The adjustment component 204 may also compare a current state of the imaging device(s) 110 (or a current FOV), with that of a FOV for an succeeding parcel 106 being imaged by the imaging device(s) 110. If the FOV is the same or the FOV is sufficient for capturing in focus image data 122, the FOV of the imaging device(s) 110 may not be adjusted. If, however, the FOVs are different, the setting(s) 120 are transmitted to the imaging device(s) 110 for use in updating the FOV 116. Adjustment of the FOV 116 may be accomplished via motor(s) within the imaging device(s) 110. As such, after the FOV 116 is adjusted for the parcels 106, the imaging device(s) 110 capture the image data 122 which is stored in the memory 128.

The image data 122 may represent images of labels attached to the parcels 106. The labels may include barcodes, QR codes, text, or other identifier(s) 206 that are capable of being extracted (e.g., read, scanned, etc.) by the control system 104. In some instances, the image data 122 may be analyzed by an image analysis component 208 to extract the identifier(s) 206 on the label of the parcels 106. The identifier(s) 206 are used to discern information about the parcels 106 such as a recipient address (shipping address), sender address, name of recipient, name of sender, tracking number, and so forth. This information may be useful for determining how to route the parcel 106 within the environment 100 (e.g., material handling facility) for delivery to a destination. As an example, as the parcels 106 are conveyed by the conveyor system 102, the image analysis component 208 may analyze the image data 122 to extract the identifier(s) 206, such as a barcode of the parcel 106. The identifier(s) 206 of the parcels 106 are used to identify the parcels 106, respectively, within a parcel database 210.

Generally, the parcel database 210 may represent a registry of recorded parcels 106 that are in the process of being shipped. Through a comparison of the identifier(s) 206 captured within the image data 122 and those stored in the parcel database 210, the destination of the parcels 106 may be determined for routing the parcels 106 within the environment 100. As such, as the parcels 106 are scanned, the parcel database 210 may be accessed for determining information about the parcels 106.

In some instances, the control system 104 includes a comparison component 212 that compares the identifier(s) 206 of the parcel 106 with those in the parcel database 210. This may include the comparison of codes (e.g., numbers, patterns, etc.) or other identifiers. If the comparison determines that the parcel 106 is identifiable, such that the identifier(s) 206 of the parcel 106 is registered within the parcel database 210, or the parcel 106 is able to be identified, the parcel 106 may be processed to a final destination. If, however, the identifier(s) 206 is not recognized or unable to be extracted from the image data 122, the parcel 106 may be routed to a defective area within the environment. Here, personnel within the environment 100 may manually review the parcel 106 for damage, rescan the parcel 106, reprint damaged labels, and so forth.

Several causes may arise from the inability to extract the identifier(s) 206 of the parcels 106. For example, the identifier(s) 206 may be damaged (e.g., label scratched), the identifier(s) 206 may be missing (e.g., label unadhered to the parcel), the images within the image data 122 may be distorted, the image data 122 may only represent portion of the labels (e.g., cut), and/or the image data 122 may be of sufficient quality to extract (or otherwise identifying) the identifier(s) 206. In instances where the identifier(s) are unable to be extracted, or are otherwise unidentifiable, the parcels 106 may be considered as defective. The presence of the defect(s) may lead to the inability of the image analysis component 208 extracting the identifier(s) 206. In instances where defect(s) are present, the image data 122 may be further analyzed to determine one or more label characteristic(s) 214.

For example, the image analysis component 208 may determine a brightness value of the image(s), a contrast within the image(s), whether a portion of the identifier(s) 206 was not shown in the image(s) (e.g., cut), whether the image(s) do not contain a sufficient resolution, gain, exposure and so forth. These features may be identified and stored as the label characteristic(s) 214 within the memory 128 and used to determine the cause of the unsuccessful extraction. For example, a luminosity of the image(s) may be determined based on a number, or percentage, of white and black pixels in the image(s). Brightness may additionally or alternatively be determined based on intensity values associated with pixels in the image(s). Contrast may be determined based on a difference between a highest and lowest intensity value of the image(s). If the image(s) are too bright, for example, the image analysis component 208 may be unable to identify and extract the identifier(s) 206 on the label. By determining the label characteristic(s) 214, the image analysis component 208 may determine whether the label characteristic(s) 214 satisfy a range of acceptable ranges and/or thresholds. For example, if a brightness value of the image(s) are outside a range of acceptable values, the label may be too dark or too bright. As another example, if contrast values are outside a range of acceptable values, colors within the image may not be discernable and the identifier(s) 206 may be indiscernible. The label characteristic(s) 214 may also include a resolution of the image data 122 and/or a text size associated with character(s) on the label.

Still, at a time of capturing the image data 122, the control system 104 may determine setting(s) of the imaging device(s) 110 and/or the lighting element(s) 124. For example, gain, exposure, brightness, contrast, internal illumination intensity, and/or ROI of the imaging device(s) 110 may be determined. These setting(s) may be stored as imaging device setting(s) 226 within the setting(s) 120. As discussed herein, the imaging device setting(s) 226 may be correlated to the unsuccessful extraction of the identifiers. Additionally, or alternatively, the setting(s) may include lighting element(s) setting(s) 218 that represent setting(s) of the imaging device(s) 110, such as intensity, time of illumination, polarity, and so forth.

In instances where the identifier(s) 206 are unable to be extracted, the image(s) themselves may be of insufficient quality and/or the setting(s) of the imaging device(s) 110 and/or the lighting element(s) 124 may be improper for capturing quality image data 122. Such defects, or the reason(s) associated with the inability to extract the identifier(s) 206, may be stored in a defect database 216. For example, if the image(s) are too bright, the defect database 216 may store an indication of such. If the image(s) lack sufficient contrast, the defect database 216 may store an indication of such. By storing these indications, the defect(s) may be analyzed to determine causes associated with the inability to extract the identifier(s) 206. For example, if a threshold number of the identifier(s) 206 are unable to be extracted because the image(s) are too bright, the lighting element(s) 124 may be dimmed. In turn, the image(s) may be darkened such that the identifier(s) 206 may be recognizable and capable of being extracted. Additionally, the imaging device setting(s) 226 and/or the lighting element(s) setting(s) 218 may be associated with the inability to extract the identifier(s) 206.

In some instances, the adjustment component 204 may analyze the indications stored in the defect database 216 to determine adjustment(s) to be made. Such adjustments may be stored within the setting(s) 120, either as the imaging device setting(s) 226 and/or the lighting element(s) setting(s) 218. For example, the adjustments, or the setting(s) 120 may include brightness, contrast, exposure, focus, gain, and/or internal luminosity intensity of the imaging device(s) 110. As such, the adjustment component 204 may analyze the defects and update the setting(s) 120 for capturing image data 122 that is used for successfully extracting the identifier(s) 206. The image analysis component 208 may also, in some instances, introduce a delay when the imaging device(s) 110 captures the image data 122 when only a portion, or none, of the label is shown in the image(s).

As shown, as part of controlling an amount of light emitted by the lighting element(s) 124, the adjustment component 204 may transmit the setting(s) 120 corresponding to the lighting element(s) setting(s) 218. The lighting element(s) 124, in response, may adjust in accordance with the determined lighting element(s) setting(s) 218. Adjustments to the lighting element(s) 124 may be a continuous process. For example, ambient lighting conditions within the environment 100 may change, for example, between nighttime and daytime, based on the weather, other lights within the environment, and so forth. These lighting conditions may be captured, or reflected, within the image data 122 and impact the ability to extract the identifier(s) 206. Throughout analyzing the image data 122, the lighting conditions may be discerned for use in adjusting an output of the lighting element(s) 124. Still, the lighting conditions within the environment 100 may impact the imaging device setting(s) 226 and/or the lighting element(s) setting(s) 218. The adjustment component 204 may determine, among the image data 122 in which the identifier(s) 206 were unsuccessfully extracted, the imaging device setting(s) 226 and/or the lighting element(s) setting(s) 218 to draw correlations associated with the unsuccessful extraction. Such setting(s) may be used when determining the adjustments to be made, and how to adjust the imaging device setting(s) 226 and/or the lighting element(s) setting(s) 218 for capturing the image data 122 representative of the labels.

The control system 104, in some instances, may utilize machine-learned model(s) 220 for determining defect(s) in the image data 122, or the parcel 106, associated with the inability to extract the identifier(s) 206. The machine-learned model(s) 220 may utilize AI techniques and may be configured to receive the image data 122 as an input and output indications associated with whether the parcels 106 are defective, or reason(s) why the identifier(s) 206 were unable to be extracted from the image data 122 or otherwise were invalid. In some instances, the control system 104 may determine, using the machine-learned model(s) 220, the label characteristic(s) 214, such as brightness, contrast, resolution, skews, exposure, gain, intensity, and so forth. In these examples, the machine-learned model(s) 220 may be used to analyze the image data 122 to predict reason(s) why the identifier(s) 206 were unable to be extracted or were otherwise unidentifiable within the image data 122 (e.g., too bright).

The machine-learned model(s) 220 may analyze the image data 122, or other information, for use in making such determinations, classifying the image(s), and/or determining the label characteristic(s) 214 of the image. In some instances, the machine-learned model(s) 220 may determine or generate scores for the defect(s) associated with the image data 122. In some instances, individual scores may be determined by accessing the image data 122, providing the image data 122 as input to the machine-learned model(s) 220, and generating, as output from the machine-learned model(s) 220, the score that is associated with the defect(s). The scores may be representative of the whether the label characteristic(s) 214 were associated with the inability to extract or otherwise identify the identifier(s) 206. The scores may be machine-learned scores based on training data (e.g., previous labels) that indicate causes (e.g., defect(s)) associated with being unable to extract the identifier(s) 206. The machine-learned model(s) 220 may have been previously trained based on a training data set.

Additionally, the scores may be representative of the imaging device setting(s) 226 and/or the lighting element(s) setting(s) 218 resulting in the unsuccessful extraction of the identifier(s) 206. For example, if the image data 122 is too bright, the machine-learned model(s) 220 may determine to adjust an exposure, contrast, or internal luminosity intensity of the imaging device(s) 110. Any combination of the imaging device setting(s) 226 and/or the lighting element(s) setting(s) 218 may be determined. The machine-learned model(s) 220 (or AI techniques) may determine which combinations of the imaging device setting(s) 226 and/or the lighting element(s) setting(s) 218 lead to a successful extraction of the identifier(s) 206. As an example, by analyzing the image data 122, the machine-learned model(s) 220 (or AI techniques) may determine that only a portion of the labels are captured within the image data 122. Here, the machine-learned model(s) 220 may update a ROI within the FOV associated with the imaging device(s) 110 capturing the image data 122 (e.g., 2×2 inch square). In some instances, AI techniques may be utilized for extracting features within the image data 122 for determining the imaging device setting(s) 226 and/or the lighting element(s) setting(s) 218. In some instances, the machine-learned model(s) 220 continuously determine the imaging device setting(s) 226 and/or the lighting element(s) setting(s) 218, based on the parcel characteristic(s) 202 and/or the ambient conditions within the environment 100. The imaging device setting(s) 226 and/or the lighting element(s) setting(s) 218 are therefore dynamically determined as the parcels 106 are processed for increasing a successful scan rate of the parcels 106.

Noted above, the defect database 216 represents the defect(s) present within the image data 122 and/or defect(s) associated within the inability to scan the parcels 106. Here, where defect(s) are present, or the parcel 106 is unable to be identified, such image data 122 may be stored for training the machine-learned model(s) 220. In some instances, the stored image data 122 may include defect(s), or be stored when the image data 122 is determined to include defect(s). Such defect(s) may be indicative of, or associated with, the image data 122 being too bright, too dull, not having sufficient contrast, low resolution, and so forth. In some instances, the image data 122 may be too dull because the lighting element(s) 124 are in need of replacement. In such instances, if the imaging device setting(s) 226 and/or the lighting element(s) setting(s) 218 may be unable to be achieved (e.g., worn out/burnt out) maintenance or service may be scheduled. Such determinations may come by way of the machine-learned model(s) 220.

As part of training the machine-learned model(s) 220, the image data 122 may be labeled (or otherwise associated) with ground truth to indicate that the images include defect(s). Such a label may include one or more measured characteristics of the value(s) in the image(s), or the imaging device setting(s) 226 and/or the lighting element(s) setting(s) 218, such as brightness, contrast, resolution, skew, gain, exposure, and so forth. In some instances, based on the label characteristic(s) 214, for example, the image data 122 may be labeled with an associated defect. During run operations, the machine-learned model(s) 220 may compare the image data 122 with other image data 122 stored in the defect database 216, or values associated with the defect(s) (e.g., brightness values), for use in classifying and determining a type and/or cause of the defect.

A fuzzy feedback control may additionally, or alternatively, be used to analyze the image data 122 for identifying the defect(s) and/or the setting(s) 120 (e.g., the imaging device setting(s) 226 and/or the lighting element(s) setting(s) 218) that lead to an increase in successful scans. For example, the fuzzy feedback control may determine variations in intensity, lighting controls, contrast and so forth to identify defect(s) associated with scanning the parcels 106. Such variations may be used to update the setting(s) 120, such as the imaging device setting(s) 226 and/or the lighting element(s) setting(s) 218.

The control system 104 may include one or more network interface(s) 222 for permitting communication over network(s). The network is representative of any type of communication network, including data and/or voice network, and may be implemented using wired infrastructure (e.g., cable, CATS, fiber optic cable, etc.), a wireless infrastructure (e.g., RF, cellular, microwave, satellite, Bluetooth, etc.), and/or other connection technologies. The network interface(s) 222 also permit communication with the various sensor(s), computing device(s), and/or so forth within the environment 100.

The control system 104 is further shown having access to encoder data 224 stored in the memory 128. The encoder data 224 may be generated by encoders associated with the conveyor system 102. The encoder data 224 is representative of a speed of the conveyor system 102, or a rate at which the parcels 106 are traveling along the conveyor system 102. The encoder data 224 is used to associate the setting(s) 120 with particular parcels 106 that travel on the conveyor system 102. For example, using the encoder data 224, the control system 104 may determine when the parcels 106 will arrive at the imaging device(s) 110 and/or the lighting element(s) 124 for use in updating the setting(s) 120. That is, based on the encoder data 224 and a speed at which the parcels 106 are traveling on the conveyor system 102, the setting(s) 120 may be implemented such that the parcels 106 are imaged with the their respective FOV 116 and light intensity 218. Any of the imaging device setting(s) 226 and/or the lighting element(s) setting(s) 218 may be updated for capturing the image(s). The encoder data 224 may also be used to determine whether the speed of the conveyor system 102 is greater than a threshold for imaging the parcels 106.

As used herein, a processor, such as the processor(s) 126 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 128 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 3:
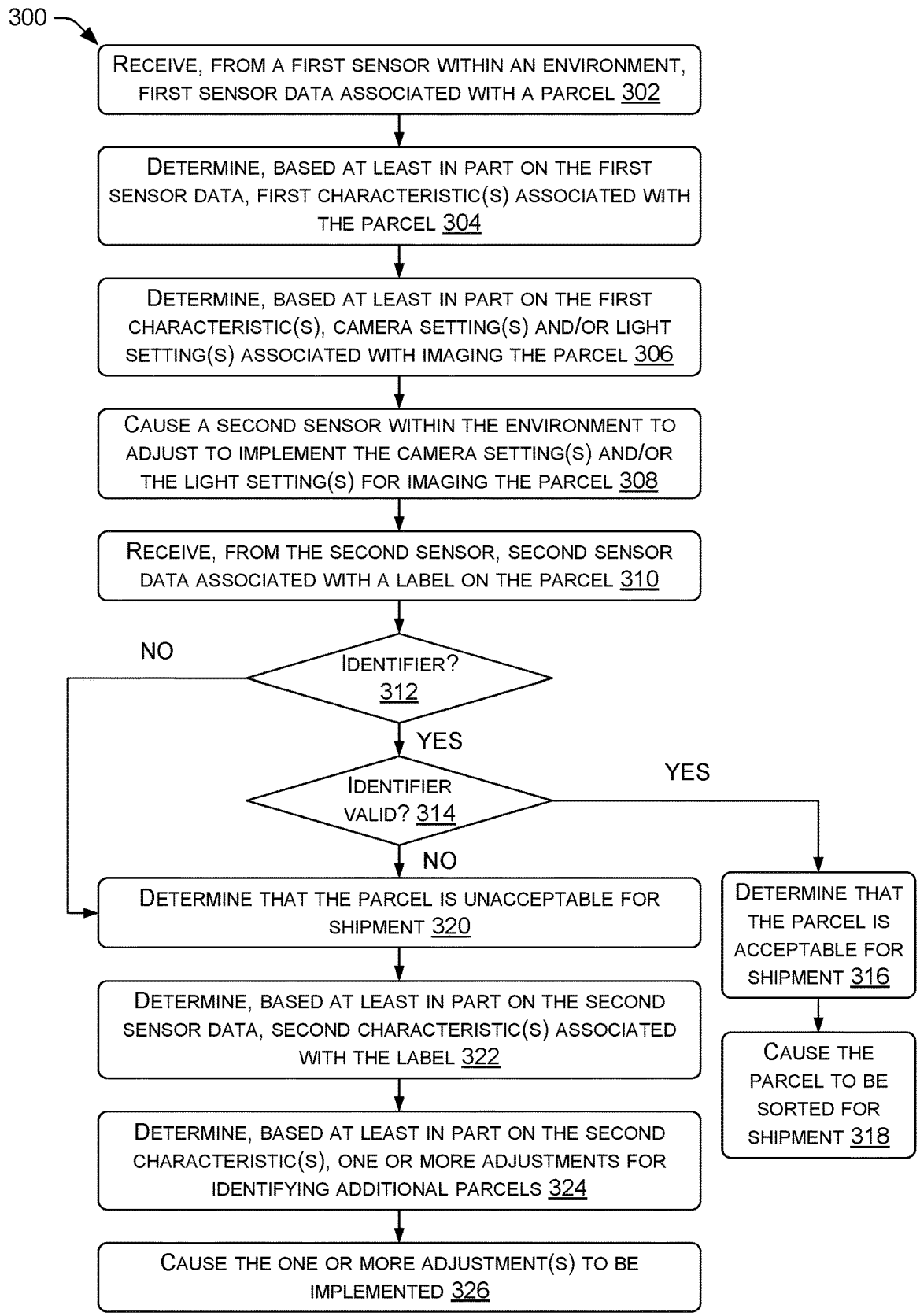
FIG. 3 illustrates an example process for determining characteristic(s) associated with a parcel and making adjustments during imaging of the parcel, according to an embodiment of the present disclosure.
Figure 4:
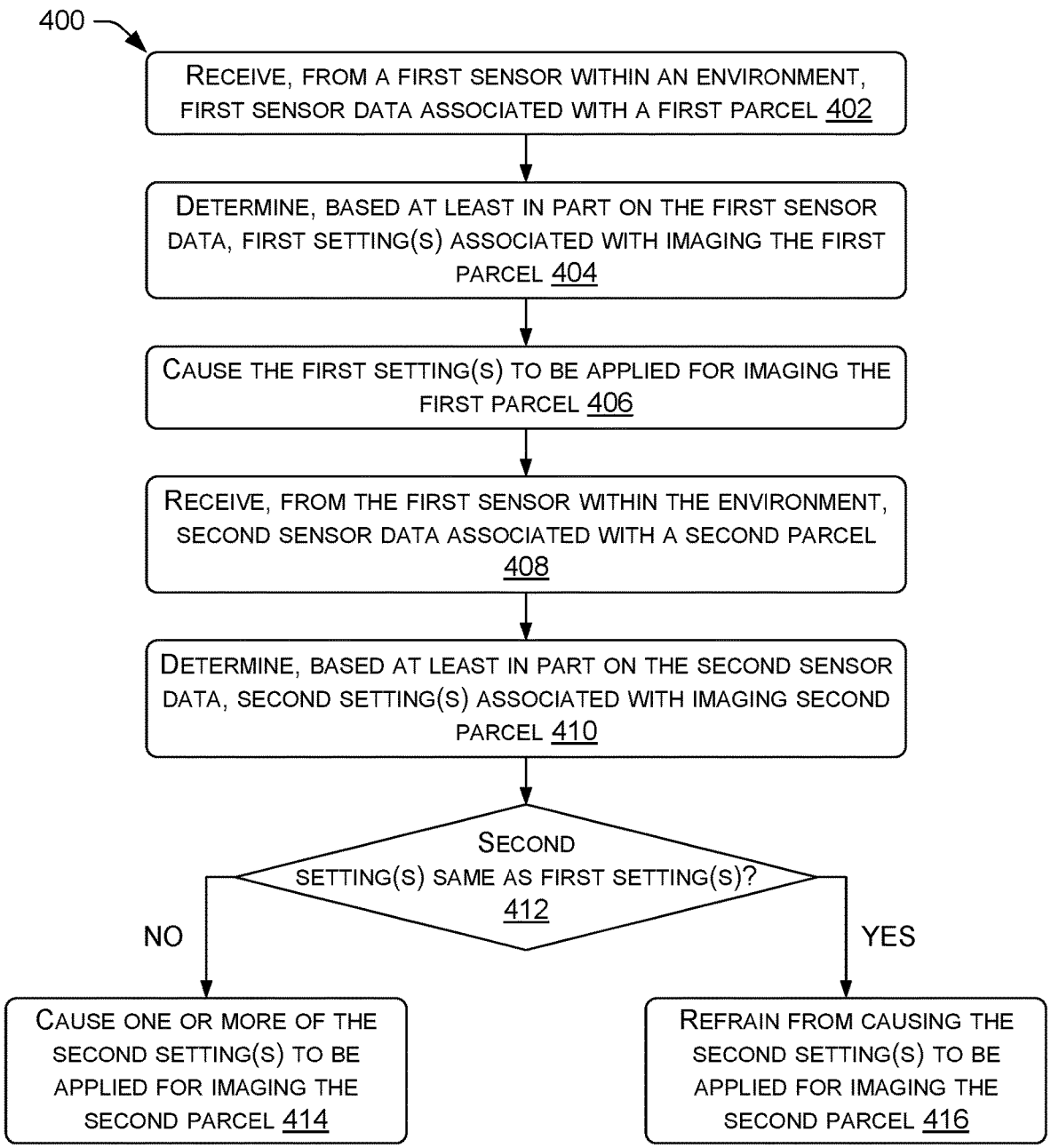
FIG. 4 illustrates an example process for applying setting(s) to image a parcel, according to an embodiment of the present disclosure.
Figure 5:
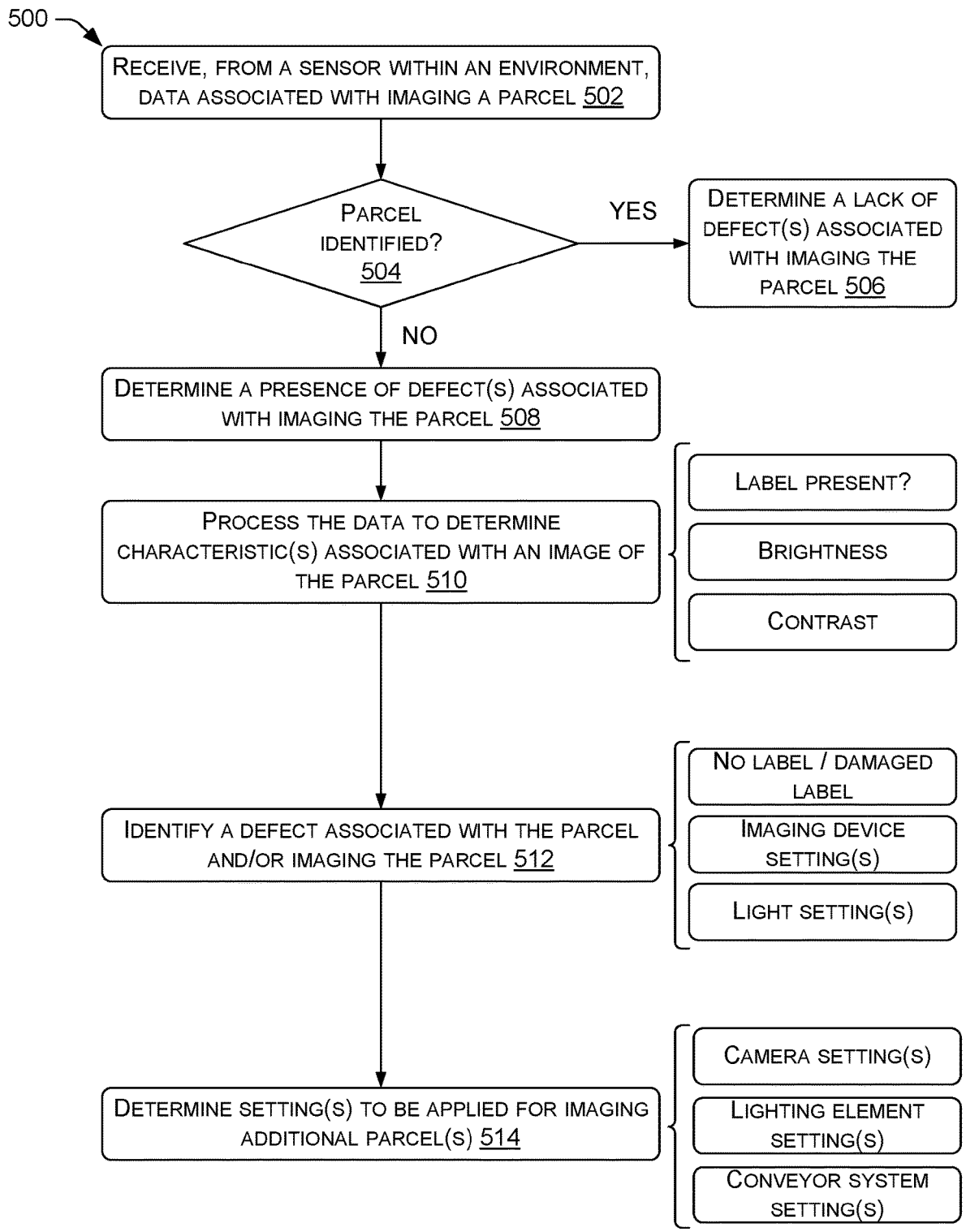
FIG. 5 illustrates an example process for determining defect(s) associated with imaging parcel(s) for use in determining adjustments to make for imaging additional parcel(s), according to an embodiment of the present disclosure.

FIGS. 3-5 illustrate various processes related to increasing a scan rate of the parcels 106. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 2, although the processes may be implemented in a wide variety of other environments, architectures and systems.

FIG. 3 illustrates an example process 300 for imaging (e.g., scanning) the parcels 106. At 302, the process 300 may include receiving, from a first sensor within an environment, first sensor data associated with a parcel. For example, the control system 104 may receive the sensor data 118 from the sensor(s) 112. The sensor(s) 112 are disposed within the environment 100 and adjacent to the conveyor system 102. In some instances, the sensor(s) 112 output the signal(s) 114 towards the parcels 106 for use in determining the parcel characteristic(s) 202 associated with the parcels 106, as discussed herein. In some instances, the sensor(s) 112 may be arranged overhead of the conveyor system 102 and/or to side(s) of the conveyor system 102.

At 304, the process 300 may include determining, based at least in part on the first sensor data, first characteristic(s) associated with the parcel. For example, the control system 104 may analyze the sensor data 118 to determine the parcel characteristic(s) 202, such as a height of the parcel 106, a width of the parcel 106, and so forth. The sensor data 118 may therefore be indicative of the dimensions of the parcel 106, or a distance interposed between the sensor(s) 112 and surface(s) of the parcels 106.

At 306, the process 300 may include determining, based at least in part on the first characteristic(s), imaging device setting(s) and/or light setting(s) associated with imaging the parcel. For example, based on the height of the parcel 106, the control system 104 may determine the imaging device setting(s) 226 and/or the lighting element(s) setting(s) 218. Example imaging device setting(s) 226 may include FOV, exposure, gain, contrast, brightness, ROI, internal luminosity, and so forth. Example lighting element(s) setting(s) 218 may include brightness, polarity, time of illumination, and so forth. As an example, the FOV 116 may be adjusted such that a top of the parcel 106 is within the FOV 116. Portions of the parcel 106 within the FOV 116 may be in focus such that a label on the parcel 106 may be analyzed. In other words, in instances where the label is located atop the parcel 106, the FOV 116 may be adjusted such that the label is within the FOV 116. Image(s) associated with the parcel 106 are therefore in focus for processing the parcel 106 for shipment. However, in some instances, the label may be located on elsewhere on the parcel 106 other than the top. Here, the FOV 116 associated with imaging the parcel 106 may be relative to the other sides such that the image(s) of the label are in focus.

At 308, the process 300 may include causing a second sensor within the environment to adjust to the imaging device setting(s) and/or the light setting(s) for imaging the parcel. For example, the control system 104 may transmit the setting(s) 120 (e.g., the imaging device setting(s) 226 and/or the lighting element(s) setting(s) 218) to the imaging device(s) 110 and/or the lighting element(s) 124. Continuing with the above example, the control system 104 may transmit the imaging device setting(s) 226 to the imaging device(s) 110 for adjusting the FOV 116. Adjusting the FOV 116 may come by way of actuating lens(es) of the imaging device(s) 110 for changing the focal length. Correspondingly, the FOV 116 may be adjusted to image the label on the parcel 106. The FOV 116 may be adjusted such that when the parcel 106 arrives under the imaging device(s) 110 (or within view of the imaging device(s) 110), the FOV 116 is already adjusted. This may be accomplished using the encoder data 224 and knowing the speed at which the conveyor system 102 is conveying the parcels 106. As such, knowing the speed of the parcel 106 permits the FOV 116 to be adjusted in time and before the parcel 106 arrives at the imaging device(s) 110. However, it is to be understood that the setting(s) 120 may include, or be associated with different or additional imaging device setting(s) 226 and/or lighting element(s) setting(s) 218.

At 310, the process 300 may include receiving, from the second sensor, second sensor data associated with a label on the parcel. For example, the control system 104 may receive, from the imaging device(s) 110, the image data 122. The image data 122 is representative of the label on the parcel 106, which may include the identifier(s) 206 for identifying the parcel 106. The identifier(s) 206, for example, may include barcodes, QR codes, and/or other machine-readable code. The identifier(s) 206 are used to process the parcel 106 within the environment 100, such as routing the parcel 106 to particular destinations. In some instances, the image data 122 may be associated with a ROI within the FOV associated with a placement (or predicted placement) of the label.

At 312, the process 300 may include determining whether an identifier is present in the image data. For example, the control system 104 may analyze the image data 122 to determine whether the label contains the identifier(s) 206. The identifier(s) 206 may be extracted from the image data 122 based on determining patterns or sequences within the image data 122. In some instances, the label may include more than one identifier, and if more than one identifier 206 is present, more than one identifier 206 may be extracted. In some instances, the control system 104 may be configured to extract the identifier(s) 206 from the image data 122 based on recognizing known patterns within the image data 122 (e.g., barcode, QR code, etc.). If at 312 the process 300 determines that the identifier(s) 206 is present, the process 300 may follow the "YES" route and proceed to 314.

At 314, the process 300 may include determining whether the identifier is valid. Whether the identifier(s) 206 is valid may include a comparison of the identifier(s) 206 to identifiers stored in the parcel database 210. For example, even though the identifier(s) 206 was extracted from the image data 122, the identifier(s) 206 may be incorrectly extracted (e.g., misread) and/or the identifier(s) 206 may not be registered within the parcel database 210. In such instances, the parcel 106 may be unidentified and the control system 104 may not know how to process the parcel 106 to a final destination. Comparatively, if the identifier(s) 206 is located in the parcel database 210, the control system 104 may recognize the parcel 106 and the parcel database 210 may be accessed for determining how to route the parcel 106.

If at 314 the process 300 determines that the identifier is valid, the process 300 may follow the "YES" route and proceed to 316. At 316, the process 300 may include determining that the parcel 106 is acceptable for shipment. For example, the control system 104 may determine the destination of the parcel 106. To determine such information, as noted above, the parcel database 210 may be accessed. Here, the process 300 (and the control system 104) may determine how to route the parcel 106 within the environment 100 for delivering the parcel 106 to a final destination. As such, in instances where the identifier(s) 206 is valid, the control system 104 may recognize the parcel 106 for use in routing the parcel 106.

In some instances, as a result of being able to extract the identifier(s) 206, the control system 104 may correlate the imaging device setting(s) 226 and/or the lighting element(s) setting(s) 218 with the parcel characteristic(s) 202, label characteristic(s) 214, a time of day, and/or other setting(s) of the environment 100 (e.g., ambient lighting conditions). Such correlations may be used when determining the imaging device setting(s) 226 and/or the lighting element(s) setting(s) 218 in further instances and what combinations of the imaging device setting(s) 226 and/or the lighting element(s) setting(s) 218 are associated with the successful extraction of identifier(s) 206.

At 316, the process 300 may include causing the parcel to be sorted for shipment. For example, the control system 104, or other communicatively coupled computing device(s), may cause the parcel 106 to be routed within the environment 100. In some instances, this may include actuating arm(s) on the conveyor system 102 or otherwise diverting the parcel 106 to particular contains, bins, and so forth. These bins, for example, may be utilized to ship the parcel 106 to the destination or one or more intermediate destinations. Therefore, by knowing the destination location of the parcel 106, the parcel 106 may be sorted for shipment.

Alternatively, if at 312, the process 300 did not identify the identifier(s) 206, the process 300 may follow the "NO" route and proceed to 318. The process 300 also illustrates that the process 300 may proceed to 318 following the "NO" route from 314, in instances where the identifier(s) 206 is invalid. In the first instance, at 312, the image analysis techniques may be unable to discern or otherwise recognize the identifier(s) 206 within the image data 122. For example, the image data 122 may be too blurry, too bright, too dull, and/or may not include sufficient contrast, exposure, gain, etc. In such instances, the identifier(s) 206 is not capable of being identified within the image data 122. Additionally, at 314, an identifier(s) 206 may be extracted, but the identifier(s) 206 may be invalid. For example, parts of the identifier(s) 206 may be damaged (e.g., scratched) or missing (e.g., cut). In such instances, an identifier 206 may be extracted, but the identifier(s) 206 may not include enough character(s) and may not be located in the parcel database 210. An absence from the parcel database 210 may indicate that the parcel 106 is not recognized by the control system 104.

At 318, the process 300 may include determining that the parcel is unacceptable for shipment. For example, in instances where the parcel 106 is not identified or does not include a valid identifier(s) 206, the control system 104 may not know how to process the parcel 106. For example, the control system 104 may not be able to determine how to route the parcel 106 to a destination.

At 320, the process 300 may include determining, based at least in part on the second sensor data, second characteristic(s) associated with the label. For example, the control system 104 may analyze the image data 122 to determine the label characteristic(s) 214, including a brightness value of the image data 122, a contrast value of the image data 122, a resolution of the image data 122, and so forth. The label characteristic(s) 214 are used to correlate the unsuccessful extraction of the identifier(s) 206 and/or the invalidity of the identifier(s) 206 within conditions within the environment 100, and/or the imaging device setting(s) 226 and/or the lighting element(s) setting(s) 218. For example, the lighting condition(s) may be too bright, the lighting condition(s) may be too dull, the image data 122 may not include sufficient contrast for identifying the identifier(s) 206, and so forth. Such condition(s) may impact the ability of the control system 104 to extract the identifier(s) 206 from the image data 122 and/or lead to incorrectly extracting the identifier(s) 206. If the image(s) are too bright, for example, the identifier(s) 206 may be unidentifiable within the image(s).

At 322, the process 300 may include determining, based at least in part on the second characteristic(s), one or more adjustment(s) for identifying additional parcels. For example, the control system 104, based on the label characteristic(s) 214, may determine adjustment(s) to be made for increasing a successful extraction of the identifier(s) 206. In some instances, the adjustment(s) may be based on a number of identifier(s) 206 that were unable to be extracted from the image data 122. For example, if a threshold number of the image(s) were too bright, the control system 104 may determine to lessen an output of light emitted by the lighting element(s) 124. In some instances, the machine-learned model(s) 220 may be used to draw correlations between the inability extract the identifier(s) 206 and the label characteristic(s) 214. For example, if the image(s) are too bright, the machine-learned model(s) 220 may correlate the inability to extract the identifier(s) 206 with the brightness of the image(s).

Other correlations may be drawn. For example, the control system 104 may determine that the portions of labels are absent from the image data 122. Here, the identifier(s) 206 may not be present within the image data 122 because the identifier(s) 206 may not be captured within the image data 122. This may be cause by a movement of the conveyor system 102 within the environment 100 such that the imaging device(s) 110 are not centered (or aligned) above the conveyor system 102, or a ROI imaged within the FOV is incorrect. The adjustment(s) may be associated with the imaging device setting(s) 226 and/or the lighting element(s) setting(s) 218, setting(s) of the conveyor system 102, and so forth.

At 324, the process 300 may include causing the one or more adjustment(s) to be instituted. For example, the control system 104 may communicate the imaging device setting(s) 226 and/or the lighting element(s) setting(s) 218 to the imaging device(s) 110, the lighting element(s) 124, and/or other computing device(s) for causing the setting(s) 120 to be instituted. In response to instituting the setting(s) 120, a success rate of extracting the identifier(s) 206 may increase. For example, the lighting element(s) 124 may be dimmed such that the image(s) within the image data 122 are readable for identifying the identifier(s) 206.

In some instances, the parcels 106 that do not include an identifier(s) 206, or have an identifier(s) 206 that is invalid, may be sorted to a defective area within the environment 100. At the defective area, the parcels 106 may be further processed. For example, labels may be reprinted to replace damaged label(s) that were unreadable. Moreover, although not illustrated, it is to be understood that the process 300 may continuously monitor the label characteristic(s) 214 for making adjustments to increase a success rate in extracting the identifier(s) 206.

FIG. 4 illustrates an example process 400 for determining setting(s) associated with imaging the parcels 106. At 402, the process 400 may include receiving, from a first sensor within an environment, first sensor data associated with a first parcel. For example, the control system 104 may receive the sensor data 118 from the sensor(s) 112. The sensor(s) 112 are disposed within the environment 100 and adjacent to the conveyor system 102 on which the parcels 106 (including the first parcel) travel. In some instances, the sensor(s) 112 output the signal(s) 114 towards the parcels 106 for use in determining the parcel characteristic(s) 202 associated with the parcels 106, as discussed herein. In some instances, the sensor(s) 112 may be arranged overhead of the conveyor system 102 and/or to side(s) of the conveyor system 102.

At 404, the process 400 may include determining, based at least in part on the first sensor data, first setting(s) associated with the first parcel. For example, the control system 104 may analyze the sensor data 118 to determine the parcel characteristic(s) 202, such as a height of the first parcel, a width of the first parcel, and so forth. The parcel characteristic(s) 202 are used to determine the setting(s) 120 (e.g., the imaging device setting(s) 226 and/or the lighting element(s) setting(s) 218) associated with imaging the first parcel. In some instances, the setting(s) 120 include the FOV 116 of the imaging device(s) 110 and/or a light intensity of the lighting element(s) 124. For example, based on the height of the first parcel, the FOV 116 of the imaging device(s) 110 may be adjusted such that the top of the first parcel is within the FOV 116 and therefore, in focus. Moreover, depending on the height of the first parcel, the light intensity of the lighting element(s) 124 may be determined to reduce glare, increase contrast, increase brightness, and/or reduce brightness. Such setting(s) 120 therefore enables the image data 122 to be analyzed for determining the identifier(s) 206 and processing the first parcel. Additional setting(s) 120, such as the imaging device setting(s) 226 may be determined as well, such as gain, exposure, contrast, internal illumination of the imaging device(s) 110, and so forth.

At 406, the process 400 may include causing the first setting to be applied for imaging the first parcel. For example, the control system 104 may communicate the setting(s) 120 to the imaging device(s) 110 and/or the lighting element(s) 124, respectively. The setting(s) 120 as noted above, in some instances, cause the imaging device(s) 110 to include the determined the imaging device setting(s) 226 and the lighting element(s) 124 to include the lighting element(s) setting(s) 218. The first setting(s) 120 are implemented by the imaging device(s) 110 and/or the lighting element(s) 124, respectively, prior to or substantially simultaneously with, the first parcel arriving at the imaging device(s) 110. Here, the imaging device(s) 110 and the lighting element(s) 124 are located downstream of the sensor(s) 112 such that the setting(s) 120 are carried out before the first parcel arrives for imaging. In some instances, the encoder data 224 is used to determine when the first parcel will arrive at the imaging device(s) 110, and such determination is used to set the imaging device setting(s) 226 and/or the lighting element(s) setting(s) 218 for imaging the first parcel.

At 408, the process 400 may include receiving, from the first sensor within the environment, second sensor data associated with a second parcel. For example, the control system 104 may receive the sensor data 118 from the sensor(s) 112. The second sensor data associated with the second parcel is received at a second instance in time, after a first instance in time in which the first sensor data associated with the first parcel was received. In other words, as the conveyor system 102 translates, the control system 104 may continuously receive the sensor data 118 from the sensor(s) 112.

At 410, the process 400 may include determining, based at least in part on the second sensor data, second setting(s) associated with the second parcel. For example, the control system 104 may analyze the sensor data 118 to determine the parcel characteristic(s) 202, such as a height of the second parcel, a width of the second parcel, and so forth. The parcel characteristic(s) 202 are used to determine the setting(s) 120 associated with imaging the second parcel, such as the imaging device setting(s) 226 and/or the lighting element(s) setting(s) 218. Such setting(s) 120 therefore enables the image data 122 to be analyzed for determining the identifier(s) 206 and processing the second parcel.

At 412, the process 400 may include determining whether the second setting(s) are the same as the first setting(s). For example, the control system 104 may compare the second setting(s) 120 and the first setting(s) to determine similarities and/or differences therebetween. For example, if the first setting(s) included a first FOV and the second setting(s) 120 include a second FOV, the control system 104 may compare the FOVs to determine whether they are the same or different. If they are different, the control system 104 may determine that the setting(s) 120 of the imaging device(s) 110 need to be updated before imaging the second parcel. If they are the same, the control system 104 may determine that the setting(s) 120 of the imaging device(s) 110 do not need to be updated. For example, the first FOV may be suitable for imaging the second parcel and capturing image data 122 that is in focus. As another example, for the lighting element(s) setting(s) 218, a first light intensity associated with imaging the first parcel may be compared against a second light intensity associated with imaging the second parcel. The comparison of the setting(s) 120 may therefore reduce an amount of adjustment(s) to the imaging device(s) 110 and the lighting element(s) 124 as the parcels 106 are imaged. Other the imaging device setting(s) 226 and/or the lighting element(s) setting(s) 218, such as exposure, and gain may be compared as well.

If at 412 the process 400 determines that the second setting(s) are the same as the first setting(s), the process 400 may follow the "YES" route and proceed to 414. At 414, the process 400 may refrain from causing the second setting(s) to be applied for imaging the second parcel. For example, the FOV associated with the first parcel and the second parcel may be same, and as such, the first setting(s) may be suitable for imaging the second parcel. Comparatively, if at 412 the process 400 determines that the second setting(s) are not the same as the second setting(s), the process 400 may follow the "NO" route and proceed to 416.

At 416, the process 400 may include causing one or more of the second setting(s) to be applied for imaging the second parcel. For example, the control system 104 may communicate the setting(s) 120 (i.e., the imaging device setting(s) 226 and/or the lighting element(s) setting(s) 218) to the imaging device(s) 110 and/or the lighting element(s) 124, respectively, depending on which of the setting(s) 120 are in need of updating. For example, the FOV 116 may not be updated, but the light intensity of the lighting element(s) 124 might be updated based on the dimension(s) of the second parcel.

Although the process 400 illustrates determining setting(s) 120 for two parcels, it is to be understood that the process 400 may continuously receive sensor data 118 for use in adjusting the setting(s) 120 based on the parcel characteristic(s) 202. Moreover, the setting(s) 120 may include more than adjusting the FOV 116, for example, but other of the imaging device setting(s) 226 and/or the lighting element(s) setting(s) 218. For example, the setting(s) 120 may additionally or alternatively include adjusting a speed of the conveyor system 102, changing an orientation of the imaging device(s) 110, and so forth.

FIG. 5 illustrates an example process for identifying defects within imaged parcels 106 and determining one or more adjustment(s) to be made for increasing a success rate in identifying the parcels 106.

At 502, the process 500 may include receiving, from a sensor within an environment, data associated with imaging a parcel. For example, the control system 104 may receive, from the imaging device(s) 110, the image data 122. The image data 122 is representative of the label on the parcel 106, which includes the identifier(s) 206 for identifying the parcel 106. The identifier(s) 206, for example, may include barcodes, QR codes, and/or other machine-readable code. The identifier(s) 206 are used to process the parcel 106 within the environment 100, such as routing the parcel 106 to particular destinations.

At 504, the process 500 may include determining whether the parcel is identified. For example, whether the parcel 106 is identified may be based at least in part on determining whether the identifier(s) 206 is present in the image data 122 and whether the identifier(s) 206 is valid. As part of this process, the control system 104 may analyze the image data 122 to determine whether the label contains the identifier(s) 206. For example, the identifier(s) 206 (if present) may be extracted from the image data 122. In some instances, the control system 104 may be configured to extract the identifier(s) 206 from the image data 122 based on recognizing known patterns within the image data (e.g., barcode, QR code, etc.). Whether the identifier(s) 206 is valid may include a comparison of the identifier(s) 206 to identifiers stored in the parcel database 210. For example, even though the identifier(s) 206 was extracted from the image data 122, the identifier(s) 206 may be incorrectly extracted (e.g., misread), the identifier(s) 206 may only be partially extracted, and/or the identifier(s) 206 may not be registered within the parcel database 210. In such instances, the parcel 106 may be unidentified and the control system 104 may not know how to process the parcel 106 to a final destination. Comparatively, if the identifier(s) 206 is located in the parcel database 210, the control system 104 may recognize the parcel 106 and the parcel database 210 may be accessed for determining how to route the parcel 106. If at 504 the process 500 determines that the parcel 106 was identified (e.g., had a valid identifier(s) 206), the process 500 may follow the "YES" route and proceed to 506.

At 506, the process 500 may include determining a lack of defects associated with imaging the parcel. For example, being as the control system 104 was able to extract the identifier(s) 206, and identify the identifier(s) 206 within the parcel database 210, the control system 104 may determine that the parcel 106 was successfully processed (e.g., scanned). This is indicative that no defects (or problems) arose when processing the parcel 106. Alternatively, if at 504 the process 500 determines that the parcel 106 is not (or cannot be identified), the process 500 may follow the "NO" route and proceed to 508.

At 508, the process 500 may include determining a presence of defect(s) associated with imaging the parcel. For example, in instances where the control system 104 is unable to identify the parcel 106, the control system 104 may determine the presence of one or more defect(s). These defect(s) may have prevented the parcel 106 being identified, or other have led to the identifier(s) 206 being unidentifiable. Indications of the defect(s) may be stored in the defect database 216.

At 510, the process 500 may include processing the data to determine characteristic(s) associated with an image of the parcel. For example, based on being unable to identify the parcel 106, the control system 104 may further process the image data 122 to determine potential causes of being unable to identify the parcel 106. As part of this process, and as shown, such characteristic(s) may include determining whether a label was present in the image data 122, a brightness of the image(s), and/or a contrast of the image(s). In such instances, the control system 104 may determine the label characteristic(s) 214, including a brightness value associated with the image data 122, a contrast value associated with the image data 122, whether an indication of the label was shown, and/or a resolution of the image data. As discussed herein, using these characteristic(s), the process 500 may determine a cause of the defect. Additionally, or alternatively, as part of determining the defects, the process 500 may determine the imaging device setting(s) 226 and/or the lighting element(s) setting(s) 218. Such setting(s) may be correlated with the inability to successfully read the parcels 106.

At 512, the process 500 may include identifying a defect associated with the parcel and/or imaging the parcel. In some instances, identifying the defect of the parcel 106 and/or imaging the parcel 106 may come by way of comparing the label characteristic(s) 214 with thresholds and/or ranges of values. For example, the brightness value of the image data 122 may be compared against a threshold brightness value, or a range of brightness values. The range of brightness values, for example, may be associated with brightness values that are capable of being read by the control system 104 for extracting the identifier(s) 206. If image(s) are too bright, the control system 104 may be unable to extract the identifier(s) 206. Comparatively, if too dark, the control system 104 may be unable to discern the identifier(s) 206. As such, if the brightness value is outside the range of brightness values, does not satisfy a threshold brightness (e.g., too dark) or is greater than a threshold brightness (e.g., too bright), the image(s) may be defective as being too bright.

Additionally, or alternatively, a contrast value may be compared against threshold(s) and/or a range of contrast values. The resolution of the image(s) may also be compared. For example, the control system 104 may be unable to extract the identifier(s) 206 from low resolution image(s). In some instances, the image data 122 may not contain labels for identifying the parcels 106. For example, the labels may be located on other surface of the parcel 106, and the imaging device(s) 110 may not capture image(s) associated with the label. In other instances, the label may be identified, but the label may be damaged such that the identifier(s) 206 are unable to be extracted. In such instances, the control system 104 may determine the presence of label(s), or a presence of a portion of the label, but may be unable to identify the label and/or the identifier(s) 206 may not completely extracted (e.g., cut-off, skewed, damaged, etc.).

As part of identifying the defect(s), the control system 104 may utilize the machine-learned model(s) 220. The machine-learned model(s) 220 may be previously trained to identify the defect(s) associated with the parcel 106 and/or imaging the parcel 106. The machine-learned model(s) 220, for example, may determine correlations between being unable to identify the parcel 106 and the imaging device setting(s) 226 and/or the lighting element(s) setting(s) 218 associated with imaging the parcel 106. For example, the machine-learned model(s) 220 may determine that the image data 122 is too bright for extracting or identifying the identifier(s) 206. As a result, the machine-learned model(s) 220 may determine updates to the imaging device setting(s) 226 and/or the lighting element(s) setting(s) 218.

As shown at 512, the defect(s) may include determining that no labels were present in the image data 122 and/or on the parcel 106, that the label was damaged, that the setting(s) 120 of the imaging device(s) were incorrect, and/or that the light setting(s) were incorrect, such as being too bright or too dark. Other defect(s) may be determined, for example, that the image data 122 was too blurry, the imaging device(s) 110 had too high of gain, exposure, contrast, and so forth.

At 514, the process 500 may include determining setting(s) to be applied for imaging additional parcels. For example, based on the defect(s) determined at 512, the process 500 may determine the imaging device setting(s) 226 and/or the lighting element(s) setting(s) 218 that resolve the defect(s). As an example, if the brightness values in the image data 122 were too high (e.g., greater than a threshold), the setting(s) 120 may include dimming light output by the lighting element(s) 124. As a result, subsequently imaged parcels 106 maybe capable of being imaged for processing. In some instances, the imaging device setting(s) 226 and/or the lighting element(s) setting(s) 218 may be determined based on a threshold number of the defect(s) being determined. For example, if a threshold number of parcels were defective because the image data 122 was too bright, the control system 104 may determine to reduce the light output by the lighting element(s) 124. Additional setting(s) 120 may include, adjusting the FOV 116 (e.g., camera shifted), slowing a speed of the conveyor system 102 (e.g., too blurry), introducing delay(s) when imaging the parcels 106, preprocessing the image data 122 to unskew the labels before extracting the identifier(s) 206, adjusting a gain, exposure, brightness, etc. of the imaging device(s) 110, and so forth.

When instituted, the imaging device setting(s) 226 and/or the lighting element(s) setting(s) 218 may therefore increase a successful scan rate of the parcels 106 for increasing a scan rate of the parcels 106. Moreover, it is to be understood that the image data 122 of the parcels 106 may continuously be analyzed to identify the defect(s) for determining setting(s) 120 that when implemented, serve to increase a scan rate when processing the parcels 106.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, from a first sensor, first sensor data associated with a first parcel being conveyed by a conveyor system;
determining, based on the first sensor data, a first dimension of the first parcel;
determining, based on the first dimension, a first setting associated with a second sensor capturing a first image of a first surface of the first parcel, the first surface containing a first shipping label;
causing the second sensor to be adjusted to the first setting such that the first surface of the first parcel is within a FOV of the second sensor, the second sensor being arranged downstream of the first sensor, relative to a direction of travel of the conveyor system;
receiving, from the second sensor, first image data representing the first image of the first shipping label;
determining, based on the first image data, a first identifier associated with the first parcel;
receiving, from the first sensor, second sensor data associated with a second parcel being conveyed by the conveyor system;
determining, based on the second sensor data, a second dimension of the second parcel;
determining, based on the second dimension, a second setting associated with the second sensor capturing a second image of a second surface of the second parcel, the second surface containing a second shipping label;
causing the second sensor to be adjusted to the second setting such that the second surface of the second parcel is within the FOV of the second sensor;
receiving, from the second sensor, second image data representing the second image of the second shipping label;
determining, based on the second image data, an absence of a second identifier associated with the second parcel; and
determining, based on determining the absence of the second identifier, a third setting associated with the second sensor or lighting elements arranged proximate to the second sensor.

2. The method of claim 1, further comprising:
determining that the first identifier is present within a parcel database associated with parcels registered for shipment; and
determining, based on the first identifier being present within the parcel database, a destination address associated with the first parcel.

3. The method of claim 2, further comprising:
determining at least one of a brightness value or a contrast value associated with the second image data; and
causing the second sensor or the lighting elements to adjust to the third setting.

4. The method of claim 1, wherein:
the first setting comprises at least one of:
a first gain of the second sensor,
a first exposure of the second sensor,
a first region of interest associated with the second sensor, a first internal luminosity of the second sensor, or
a first brightness of the second sensor; and
the second setting comprises at least one of:
a second gain of the second sensor,
a second exposure of the second sensor,
a second brightness of the second sensor,
a second region of interest associated with the second sensor,
a second internal luminosity of the second sensor, or
a second brightness of the second sensor.

5. A system comprising:
one or more processors; and
one or more non-transitory computer-readable media storing computer-executable instructions that, when executed by the one or more processors, cause the one or more processors to perform acts comprising:
receiving, from a first sensor, first data associated with a parcel traveling along a conveyor system;
determining, based at least in part on the first data, a dimension of the parcel;
determining, based at least in part on the dimension:
a first setting associated with a second sensor capturing an image of a surface of the parcel, and
a second setting associated with an amount of light to be output by one or more lighting elements positioned proximate to the conveyor system;
sending, to the second sensor, second data associated with the first setting, the second data causing the second sensor to adjust to the first setting;
sending, to one or more lighting elements, third data associated with the second setting, the third data causing the one or more lighting elements to adjust to the second setting;
receiving, from the second sensor, fourth data associated with the image of the surface of the parcel; and
determining, based at least in part on the fourth data, one of:
an absence of a defect associated with imaging the parcel, or
a presence of the defect associated with imaging the parcel.

6. The system of claim 5, wherein the first setting comprises at least one of:
a gain of the second sensor;
an exposure of the second sensor;
a field of view (FOV) of the second sensor;
a brightness of the second sensor
an internal luminosity of the second sensor; or
a region of interest (ROI) associated with the second sensor.

7. The system of claim 5, wherein:
the first sensor is located at a first position at the conveyor system;
the second sensor is located at a second position at the conveyor system, the second position being downstream of the first sensor, relative to a direction of travel associated with the conveyor system; and
the first setting of the second sensor is adjusted prior to the second sensor capturing fourth data associated with the image of the surface of the parcel.

8. The system of claim 5, wherein determining the absence of the defect comprises:
determining an identifier associated with the parcel, and
determining, based at least in part on a parcel database, that the identifier is verified for shipment; and
the acts further comprising causing the parcel to be routed to a location associated with shipping the parcel.

9. The system of claim 5, wherein determining the presence of the defect comprises determining a lack of an identifier associated with the parcel, the acts further comprising causing the parcel to be routed to a location associated with parcels in which identifiers were not detected.

10. The system of claim 9, the acts further comprising determining, based at least in part on determining the presence of the defect, a third setting for identifying identifiers associated with parcels traveling along the conveyor system.

11. The system of claim 10, the acts further comprising:
determining a number of instances associated with the presence of the defect; and
determining that the number of instances satisfies a threshold number of instances,
wherein determining the third setting is based at least in part on the number of instances satisfying the threshold number of instances.

12. The system of claim 5, wherein determining the presence of the defect comprises determining a lack of an identifier associated with the parcel, the acts further comprising determining, based at least in part on the lack of the identifier, at least one of:
a brightness value associated with the fourth data,
a contrast value associated with the fourth data, or
a resolution associated with the fourth data.

13. The system of claim 5, wherein the dimension of the parcel comprises a height of the parcel, above the conveyor system.

14. The system of claim 5, the acts further comprising:
receiving, from the first sensor, fifth data associated with a second parcel traveling along the conveyor system;
determining, based at least in part on the fifth data, a second dimension of the second parcel;
determining, based at least in part on the second dimension, a third setting associated with the second sensor capturing a second image of a second surface of the second parcel, the third setting being different than the first setting; and
sending, to the second sensor, sixth data associated with the third setting, the fifth data causing the second sensor to adjust to the third setting.

15. A method comprising:
receiving, from a first sensor, first data associated with a parcel being conveyed by a conveyor system;
determining, based at least in part on the first data, one or more characteristics associated with the parcel;
determining, based at least in part on the one or more characteristics:
a first setting associated with a second sensor arranged to image the parcel, and
a second setting associated with one or more lighting elements illuminating the parcel;
causing the first setting and the second setting to be implemented;
receiving, from the second sensor, second data associated with an image of the parcel;
determining, based at least in part on the second data, a lack of an identifier associated with the parcel; and
determining at least one of a third setting associated with the second sensor or a fourth setting associated with the one or more lighting elements.

16. The method of claim 15, wherein the one or more characteristics comprises at least one of:
a height of the parcel above the conveyor system;
a width of the parcel;

a length of the parcel; or a distance interposed between the first sensor and the parcel.

17. The method of claim 15, wherein:

the first setting comprises at least one of:
- a field of view (FOV) of the second sensor, a surface of the parcel being within the FOV,
- a gain of the second sensor,
- an exposure of the second sensor,
- a brightness of the second sensor,
- a region of interest associated with the second sensor,
- an internal luminosity of the second sensor, or
- a brightness of the second sensor; and the second setting comprises an amount of illumination output by the one or more lighting elements.

18. The method of claim 15, further comprising causing the parcel to be routed to a location associated with unidentified parcels.

19. The method of claim 15, further comprising determining at least one of:
- a brightness value associated with the image,
- a contrast value associated with the image, or
- a resolution associated with the image; and wherein the third setting is based at least in part on the at least one of the brightness value, the contrast value, or the resolution.

20. The method of claim 15, further comprising:

causing at least one of the third setting or the fourth setting to be implemented;

receiving, from the second sensor, third data associated with a second image of a second parcel; and determining, based at least in part on the second data, a second identifier associated with the second parcel.

* * * * *